(12) United States Patent
Ootomo et al.

(10) Patent No.: US 7,647,897 B2
(45) Date of Patent: Jan. 19, 2010

(54) HEATING APPARATUS

(75) Inventors: Ichiro Ootomo, Kakogawa (JP); Hiroshi Asakura, Akashi (JP); Toshihiro Hori, Tatsuno (JP); Nobuhiro Takeda, Himeji (JP); Kazuhiro Kimura, Kakogawa (JP); Akira Tsutsumi, Himeji (JP); Takayasu Fujita, Akashi (JP); Masakuni Morikawa, Kakogawa (JP)

(73) Assignee: Noritz Corporation (JP)

( * ) Notice: Subject to any disclaimer, the term of this patent is extended or adjusted under 35 U.S.C. 154(b) by 158 days.

(21) Appl. No.: 10/593,350

(22) PCT Filed: Mar. 23, 2005

(86) PCT No.: PCT/JP2005/005241

§ 371 (c)(1),
(2), (4) Date: May 4, 2007

(87) PCT Pub. No.: WO2005/093335

PCT Pub. Date: Oct. 6, 2005

(65) Prior Publication Data

US 2008/0061160 A1    Mar. 13, 2008

(30) Foreign Application Priority Data

Mar. 25, 2004  (JP)  ............................. 2004-088402
Mar. 25, 2004  (JP)  ............................. 2004-089439

(51) Int. Cl.
*F22B 1/02*    (2006.01)

(52) U.S. Cl. .................... 122/33; 122/31.1; 165/104.14
(58) Field of Classification Search ................ 122/31.1, 122/32, 33, 15.1, 18.1; 165/104.14, 104.19, 165/104.22; 237/8 B, 8 R, 19
See application file for complete search history.

(56) References Cited

U.S. PATENT DOCUMENTS 1,894,760 A * 1/1933 Dodd ......................... 165/110

(Continued)

FOREIGN PATENT DOCUMENTS

JP     A-H11-148723     6/1999

(Continued)

OTHER PUBLICATIONS

International Search Report from International Application No. PCT/JP2005/005241.

*Primary Examiner*—Gregory A Wilson
(74) *Attorney, Agent, or Firm*—Wood, Phillips, Katz & Clark & Mortimer

(57) ABSTRACT

A heating apparatus 1 includes a shell 2, a primary heat exchanger (sensible heat exchanger) 3, a burner (combustion means) 5, and a fan 6. A secondary heat exchanger (latent heat exchanger) 7 has a plurality of heat receiving tubes 18 arranged in parallel between a pair of headers 16 and 17, the heat receiving tubes 18 being fixed to tube plates 20. The heat receiving tubes 18 are bare tubes without fins and are arranged across flow of combustion gas. The number of the tubes 18 arranged vertically is less than the number of the tubes 18 arranged horizontally.

3 Claims, 17 Drawing Sheets

U.S. PATENT DOCUMENTS

| | | | |
|---|---|---|---|
| 3,773,019 A * | 11/1973 | Hapgood | 122/33 |
| 4,158,438 A * | 6/1979 | Hapgood | 237/7 |
| 5,477,846 A * | 12/1995 | Cameron | 126/109 |
| 6,345,769 B2 * | 2/2002 | MacIntyre | 237/8 R |
| 6,427,638 B1 * | 8/2002 | Kolbusz et al. | 122/15.1 |
| 6,606,968 B2 * | 8/2003 | Iwama et al. | 122/18.1 |
| 7,258,080 B2 * | 8/2007 | Missoum et al. | 122/18.1 |
| 7,322,532 B2 * | 1/2008 | Takada et al. | 236/11 |
| 7,458,340 B2 * | 12/2008 | Takeda et al. | 122/31.1 |
| 2008/0277097 A1 * | 11/2008 | Min | 165/104.14 |

FOREIGN PATENT DOCUMENTS

| | | | |
|---|---|---|---|
| JP | 2000-111172 A | | 4/2000 |
| JP | A-2000-130855 | | 5/2000 |
| JP | 2000-205658 A | | 7/2000 |
| JP | A-2000-193210 | | 7/2000 |
| JP | A-2000-274828 | | 10/2000 |
| JP | 2000-304352 A | | 11/2000 |
| JP | 2000304352 A | * | 11/2000 |
| JP | 2000346456 A | * | 12/2000 |
| JP | 2001-012890 A | | 1/2001 |
| JP | 2002349968 A | * | 12/2002 |
| JP | A-2004-028447 | | 1/2004 |
| JP | A-2004-239467 | | 8/2004 |
| JP | A-2004-360968 | | 12/2004 |

\* cited by examiner

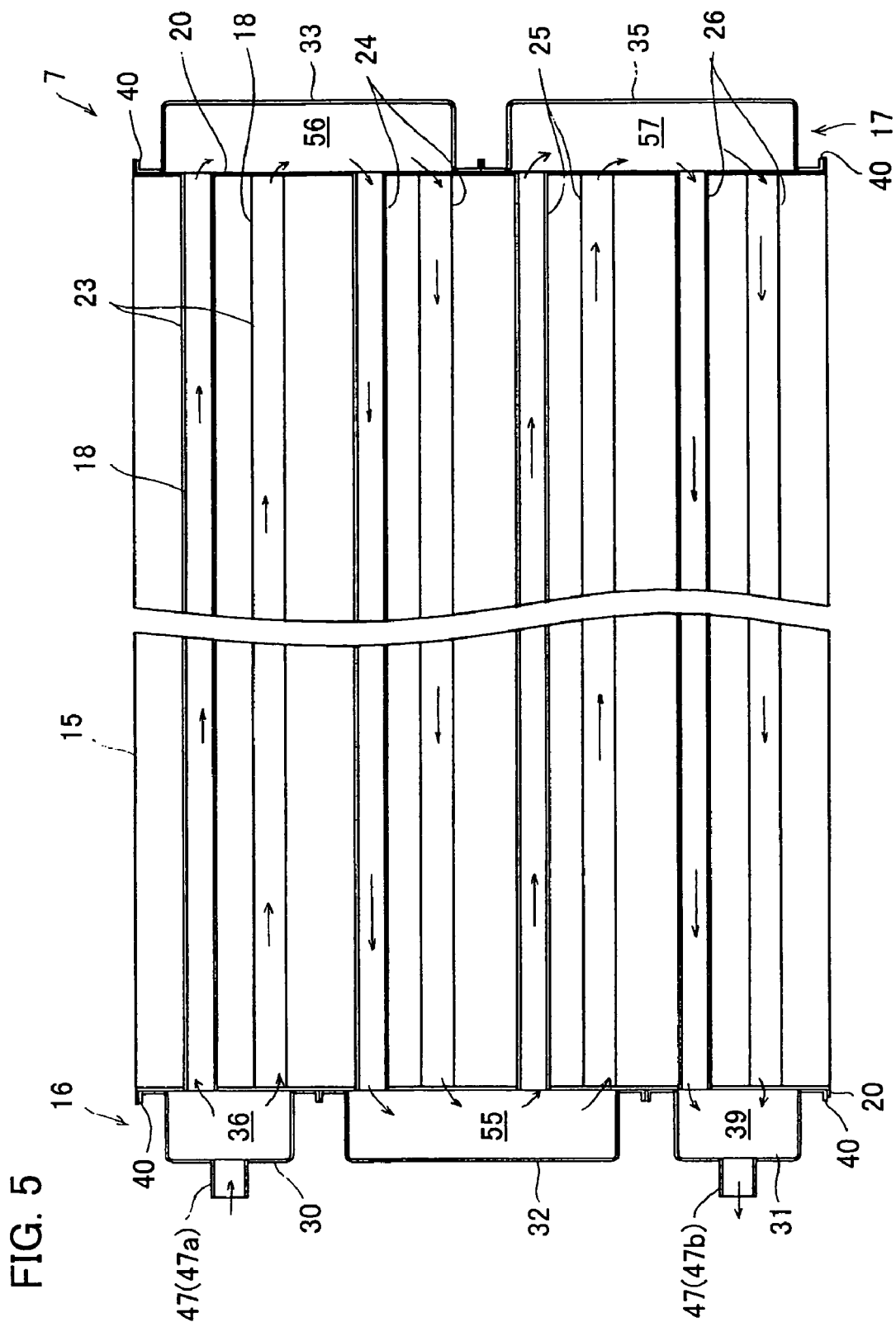

HEATING APPARATUS

CROSS-REFERENCE TO RELATED APPLICATION

This application is a 371(c) National Stage of International Patent Application No. PCT/JP2005/005241 filed Mar. 23, 2005, which claims priority of Japanese Patent Application Nos. 2004-089439 and 2004-088402 filed Mar. 25, 2004, the disclosures of which are incorporated herein by reference.

BACKGROUND OF THE INVENTION

1. Technical Field

The present invention relates to a heating apparatus using a burner, especially to a heating apparatus for heating water provided with a heat exchanger adapted to utilize (recover) latent heat of combustion gas.

Herein, in the present application, the term "water" includes cold water and hot water, if not otherwise specified.

2. Background Art

A heating apparatus (also called a heat source equipment) using a burner for burning gas or liquid fuel is commonly used as heat source for a device such as a water heater or a bath heater. Recently, a combustion-type heating apparatus having higher heat efficiency than the conventional one has been desired in the point of view of energy saving or environmental conservation. Therefore, in order to achieve the above-mentioned object, a combustion-type heating apparatus provided with a plurality of heat exchangers or a heating apparatus of the combustion type referred to as "of the latent heat recovery type" or "of the latent heat use type", which can utilize (or recover) not only sensible heat of combustion gas but also latent heat thereof, has been proposed.

The conventional combustion-type heating apparatus of the latent heat recovery type has such a configuration as disclosed in a patent document 1 listed below, for example, and has a heat exchanger for sensible heat mainly transferring sensible heat of combustion gas to water supplied to the apparatus and a heat exchanger for latent heat mainly transferring latent heat of combustion gas to water supplied to the apparatus (also transferring the remaining sensible heat to the water).

FIG. 17 is a model diagram of a combustion-type heating apparatus of the latent heat recovery type described in the patent document 1, which uses a finned tube 200 as a latent heat exchanger. Herein, the finned tube 200 is a heat receiving tube around which fins are welded and also called a fin tube.

In the art, the finned tube 200 is directly inserted into a combustion gas passage 201. Specifically, in the art, a wall 202 defines the combustion gas passage 201, into which the finned tube 200 is inserted, as shown in FIG. 17. In the art, the finned tube 200 in the passage 201 is a tube bent and serially arranged.

On the other hand, heating apparatus (heat source equipment) provided with a plurality of functions such as a hot-water supply function and an air heating function or a function of heating water of the bath again are in widespread use. Most of these types of heating apparatus each have a plurality of heat exchange circuits, as exemplified by a heating apparatus employing a so-called two-burner and two-water passage system, as disclosed in the patent document 2 listed below.

Patent Document 1: JP 11-148642A

Patent Document 2: JP 2003-4227A

DISCLOSURE OF THE INVENTION

Problems to be Solved by the Invention

The combustion-type heating apparatus of the latent heat recovery type in the art has higher heat efficiency than other normal combustion-type heating apparatus. However, further improvement of heat efficiency is desired in the market.

Herein, it may be supposed as a means for improvement of heat efficiency to make a total length of the finned tube 200 inserted into the combustion gas passage 201 longer to enhance heat exchange efficiency of a latent heat exchanger. However, if and when the total length of the finned tube 200 is made longer, volume occupied by the latent heat exchanger becomes larger, resulting in making the entire size of the apparatus larger.

It is therefore an object of the present invention to develop a combustion-type heating apparatus adapted to further improve heat efficiency avoiding excessive enlargement of its entire size.

Herein, most of heating apparatus having a plurality of functions each have a plurality of heat exchange circuits as the heating apparatus with two burners and two water passages disclosed in the patent document 2 described above. As to the heating apparatus having such a configuration each, it is also desired to employ a heat exchanger for collection (recovery) of latent heat so as to make efficient use of energy.

SUMMARY OF THE INVENTION

Careful studies to solve the problems described above brought about a conclusion that drain considerably causes reduction of heat exchange efficiency of a latent heat exchanger. Specifically, since a combustion-type heat exchanger of the latent heat recovery type utilizes (recovers) even latent heat of combustion gas, water vapor included in the combustion gas is liquefied to generate a large amount of drain. The drain is generated on and adhered to the surface of the latent heat exchanger, so that the combustion gas is brought into contact with the drain, and whereby heat energy of the combustion gas is drawn by the drain. Thus, heat of the combustion gas is used for revaporization of the drain, resulting in reduction of heat energy contributed to temperature rising of water in the heat exchanger.

In addition, when adhering to the surface of the latent heat exchanger, a large amount of drain decreases heat transfer to inside of the heat exchanger, resulting in substantial reduction of heat exchange efficiency.

Herein, the drain is a corrosive liquid including acidic component due to exposure to the combustion gas. Therefore, the latent heat exchanger for use in the conventional heating apparatus of the latent heat recovery type is obliged to be made of a high corrosive-resistant and costly material, causing cost rising.

Further, in order to ensure a large contact area with the combustion gas without excessive enlargement of the entire size, it has been revealed that it is desirable to employ a heat exchanger having such a structure as arranging a plurality of heat receiving tubes in parallel. There have been no previous cases in which such a heat exchanger just described is employed as a latent heat exchanger of a combustion-type heating apparatus because it is generally thought to be difficult to miniaturize such a heat exchanger. It is often the case that a laminated heat exchanger is employed for a device generally requiring a compact and high-efficiency heat exchanger. However, according to the studies by the inventors, the laminated heat exchanger has poor efficiency of discharging of drain, and thus, in order to employ as a latent heat exchanger of a combustion-type heating apparatus, the above-mentioned heat exchanger having a plurality of heat receiving tubes arranged in parallel is more suitable than one just described.

Still further, the heat exchanger having a plurality of heat receiving tubes arranged in parallel expands the possibility of design compared with a laminated heat exchanger. Specifically, the heat exchanger having a plurality of heat receiving tubes arranged in parallel can change design of its overall configuration by appropriately selecting length or horizontal and vertical arrangement of tubes and is easy to design in shape corresponding to a combustion-type heating apparatus. That avoids generating idle space in the combustion-type heating apparatus and substitutes to miniaturization of the apparatus as a result.

One of aspects of the present invention made in a view described above is therefore to provide a heating apparatus including a burner, a combustion gas passage for guiding combustion gas generated in the burner, a primary heat exchanger for heating water by heat of the combustion gas and positioned in the combustion gas passage, and a secondary heat exchanger for heating water by heat of the combustion gas and positioned in the passage downstream of the primary heat exchanger, wherein the primary and secondary heat exchangers are connected so that water having passed through the secondary heat exchanger should flow into the primary heat exchanger and wherein the secondary heat exchanger includes a number of heat receiving tubes arranged in parallel.

Herein, the primary heat exchanger is adapted to heat water using mainly sensible heat of the combustion gas generated in the burner, whereas the secondary heat exchanger is adapted to heat water using mainly latent heat of the combustion gas.

A combustion-type heating apparatus having such a configuration employs a device in which a plurality of heat receiving tubes are arranged in parallel as the secondary heat exchanger or the latent heat exchanger. Thus, the combustion-type heating apparatus in the present aspect has frequent contact of the combustion gas with the heat receiving tubes, thereby ensuring high heat efficiency.

The heat receiving tubes of the secondary heat exchanger are preferably bare tubes (viz. tubes without fins).

Generally, a liquid-vapor heat exchanger often uses finned heat receiving tubes for the purpose of increase of contact with combustion gas or the like. Conversely, a liquid-vapor heat exchanger seldom uses bare tubes as heat receiving tubes.

However, it has been revealed by the studies of the inventors that sufficient high heat efficiency is obtained even by the use of bare tubes without fins as heat receiving tubes for use in a secondary heat exchanger (latent heat exchanger).

A combustion-type heating apparatus of the latent heat recovery type, which utilizes (recovers) even latent heat of combustion gas, generates a large amount of drain by liquefaction of water vapor contained in the gas. The conventional latent heat exchanger uses heat receiving tubes each having fins, resulting in adhesion of drain to the fins, which drain may coat the tubes.

Thus, since most of heat energy of the gas is used for revaporization of the drain, heat energy contributing to temperature rising of water in the heat exchanger may be reduced. Especially, retention of the drain in areas among fins on the heat receiving tubes may cover all about the tubes, significantly reducing heat exchange efficiency.

In the conventional latent heat exchanger, it is difficult to remove the drain as the heat receiving tubes each have fins, reducing heat exchange efficiency.

In contrast, according to the above-mentioned configuration, the drain is smoothly removed and generates only thin film on the tubes because the heat receiving tubes are bare tubes, and whereby heat exchange efficiency does not reduce so much.

The primary heat exchanger is preferably a fin-and-tube heat exchanger.

Since the primary heat exchanger (sensible heat exchanger) has high heat efficiency if being of a fin-and-tube type and the secondary heat exchanger (latent heat exchanger) has high heat efficiency if being a bare tube because of the above-mentioned reason, a combination of these exchangers provides high heat efficiency as a whole.

In the heating apparatus in the present aspect, it is preferable that the heat receiving tubes of the secondary heat exchanger make up a three-dimensional structure in which the tubes are arranged vertically and horizontally, the number of the tubes arranged vertically being less than the number of the tubes arranged horizontally.

In the heating apparatus having such a configuration, the heat receiving tubes of the secondary heat exchanger (latent heat exchanger) make up a three-dimensional structure in which the tubes are arranged vertically and horizontally, but the number of the tubes arranged vertically is less than the number of the tubes arranged horizontally. Therefore, the drain is smoothly removed.

Since steric arrangement of the tubes causes natural drops of drain generated in the upper part of the tubes on the tubes positioned below, an amount of drain adhering to the tubes positioned at the lower part may be increased, resulting in reduction of heat exchange efficiency of the tubes at the lower part.

On the contrary, in the present configuration, the number of tubes arranged vertically is less than that arranged horizontally. Therefore, in the heating apparatus having the present configuration, drain generated in the upper part of the tubes has little influence on the tubes at the lower part because the number of tubes arranged vertically is small.

Further, the heat receiving tubes of the secondary heat exchanger are preferably arranged across flow of the combustion gas.

According to such a configuration, the combustion gas readily blows away the drain adhering to the tubes. Thus, film of the drain generated on the tubes is thin, and whereby heat exchange efficiency does not reduce so much.

The heat receiving tubes of the secondary heat exchanger are preferably arranged in staggered rows.

Arrangement of the tubes in staggered rows allows longer contact time of the tubes with the combustion gas and more efficient heat exchange than arrangement thereof in rows and columns.

Further, it is preferable that the secondary heat exchanger includes a pair of headers between which the heat receiving tubes are arranged in parallel, that the headers each include a tube plate to which the heat receiving tubes are fixed on its surface and a passage-forming member positioned at the other surface of the tube plate so as to form a part of a water passage, and that the headers function as parts of walls of the combustion gas passage extending from the burner to a gas-discharging portion.

Such a configuration miniaturizes the overall dimensions of the heating apparatus because the headers of the secondary heat exchanger (latent heat exchanger) constitute parts of the combustion gas passage.

The heating apparatus in the present aspect may have a plurality of the burners and a plurality of the combustion gas passages, so that the apparatus consists mainly of a plurality of heating systems each constituted by at least one of the burners and at least one of the passages, and have a plurality of the primary heat exchangers accompanying the heating systems respectively, wherein the secondary heat exchanger has a plurality of the heat receiving tubes extending over at least two of the heating systems.

According to such a configuration, in the heating apparatus having a plurality of the heating systems each accommodating the burner and the combustion gas passage in which the combustion gas generated in the burner flows, the heat receiving tubes constituting the secondary heat exchanger (latent heat exchanger) are arranged so as to extend over a plurality of the systems and are long. Thus, such heating apparatus requires a small number of the tubes required for ensuring heat transfer area provided for heat exchange with the combustion gas. Consequently, the heating apparatus having high energy efficiency and capable of making good use (recovering) of heat energy included in the combustion gas is provided with minimizing labor and cost for production of the heat exchanging means.

It is possible that the secondary heat exchanger is constituted by a pair of headers between which the heat receiving tubes are arranged in parallel, the headers each comprising a tube plate to which the heat receiving tubes are fixed on its surface and a passage-forming member positioned at the other surface of the tube plate so as to form a part of a water passage, the heat receiving tubes being arranged in such a manner that a plurality of the water passages each constituted by a plurality of the heat receiving tubes are communicated mutually by a plurality of the passage-forming members, so as to make up a unitary passage in which water flows in turning flow direction.

Further, it is possible that the secondary heat exchanger is constituted by a pair of headers between which the heat receiving tubes are arranged in parallel, the headers each comprising a tube plate to which the heat receiving tubes are fixed on its surface and a passage-forming member positioned at the other surface of the tube plate so as to form a part of a water passage, the heat receiving tubes being bare tubes and arranged in such a manner that a plurality of the water passages each constituted by a plurality of the heat receiving tubes are communicated mutually by a plurality of the passage-forming members, so as to make up a unitary passage in which water flows in turning flow direction.

It is possible that the heating apparatus of the present aspect described above has a plurality of the burners and a plurality of the combustion gas passages, so that the apparatus consists mainly of a plurality of heating systems each constituted by at least one of the burners and at least one of the passages, and has a plurality of the primary heat exchangers accompanying the heating systems respectively, wherein the secondary heat exchanger is constituted by a pair of headers between which the heat receiving tubes are arranged in parallel, the headers each comprising a tube plate to which the heat receiving tubes are fixed on its surface and a passage-forming member positioned at the other surface of the tube plate so as to form a part of a water passage, the heat receiving tubes being bare tubes and arranged in such a manner that a plurality of the water passages each constituted by a plurality of the heat receiving tubes are communicated mutually by a plurality of the passage-forming members, so as to make up a unitary passage in which water flows in turning flow direction, and to extend over at least two of the heating systems.

Another aspect of the present invention is a heating apparatus including a plurality of heating systems each having a burner and a combustion gas passage for guiding combustion gas generated in the burner, and a heat exchanging means for heating water by heat exchange with the combustion gas, wherein the heat exchanging means has a heat exchange circuit constituted by a heat exchanger having a plurality of heat receiving tubes extending over at least two of the heating systems.

According to such a configuration, the heat receiving tubes constituting the heat exchanging means are arranged so as to extend over a plurality of the system and are long. Thus, such heating apparatus requires a small number of the tubes required for ensuring heat transfer area provided for heat exchange with the combustion gas. Consequently, the heating apparatus having high energy efficiency and capable of making good use (recovering) of heat energy included in the combustion gas is provided with minimizing labor and cost for production of the heat exchanging means.

Further, the heat exchanging means employed in such heating apparatus requires a small number of the tubes in relation to contact areas of the tubes with the combustion gas, thereby achieving a compact configuration. Consequently, the present aspect can provide miniaturization of the heating apparatus provided with the heat exchanging means.

Herein, for compactification of the configuration, a plurality of tubes are preferably arranged in parallel.

In the heating apparatus of the present aspect, the heat exchanging means preferably has a first heat exchange circuit and a second heat exchange circuit, the first and second heat exchange circuits being arranged in rows along a flow direction of the combustion gas, the second circuit being constituted by a heat exchanger having a plurality of the heat receiving tubes, which extend over at least two of the heating systems.

In the heating apparatus in the present aspect, it is preferable that the heat exchanger has a receptacle for accommodating the heat receiving tubes, that the receptacle has a gas inlet and a gas outlet for guiding the combustion gas into and out of the receptacle, and a communicating passage that communicates between the gas inlet and the gas outlet, and that the heating apparatus further includes a resistance member positioned in the communicating passage and adapted to increase resistance against gas flow from the gas inlet to the gas outlet.

Such a configuration allows the combustion gas introduced into the receptacle to retain for a long period of time because of the resistance member for increasing resistance against flow of the combustion gas provided in the communicating passage between the gas inlet and the gas outlet. Thus, the combustion gas introduced into the heat exchanging means is brought into contact with the substantially entire area of each of the tubes constituting the heat exchange circuit and discharged after sufficient heat exchange. Consequently, the energy-efficient heating apparatus having a compact configuration of the heat exchange circuit and capable of making good use (recovering) of heat energy of the combustion gas is provided.

As described above, such heating apparatus makes enough use of heat energy even with a small number of the tubes because the substantially entire area of each of the tubes constituting the heat exchanging means has contact with the combustion gas. Therefore, such heating apparatus has a small number of the heat receiving tubes constituting the heat exchanging means. That makes the heat exchanging means to have a compact configuration, thereby much more miniaturizing the entire heating device with labor for brazing of the tubes omitted and cost for production of the heat exchanging means minimized.

The resistance member may be formed by a group of the heat receiving tubes arranged in a certain area more densely than the rest of the tubes arranged in the other area, so as to increase resistance against flow of the combustion gas.

Such a configuration simply forms the resistance member, dispensing with a special member.

The resistance member is preferably positioned across an imaginary straight line connecting the gas inlet and the gas outlet.

Such a configuration prevents the combustion gas introduced through the gas inlet from being directly led to the gas outlet, so as to diffuse the combustion gas within the receptacle. Consequently, the above-mentioned configuration makes efficient use of heat transfer areas of the heat receiving tubes, thereby making the heat exchanging means to have a compact configuration.

The resistance member preferably has a surface positioned substantially parallel to the gas inlet.

Such a configuration diffuses the combustion gas introduced through the gas inlet within the receptacle. Consequently, the above-mentioned configuration makes efficient use of heat transfer areas of the heat receiving tubes, thereby making the heat exchanging means to have a compact configuration.

Further, such a heating apparatus has high heat transfer (recover) efficiency with respect to each of the heat receiving tubes constituting the heat exchanging means, requiring a small number of the tubes required for transferring heat energy. Consequently, the heating apparatus requiring only small space for installation of the heat exchanging means is provided with labor for brazing of the tubes omitted and cost for production of the heat exchanging means minimized.

Further, the heat exchanging means may be constituted by a plurality of the heat exchange circuits.

Such a configuration provides the heating apparatus having high heat efficiency capable of making sufficient use of heat energy of the combustion gas generated by combustion and capable of making efficient use of the energy for heating water or thermal medium.

The heat exchanging means may be formed by a plurality of the heat exchange circuits arranged in rows along a flow direction of the combustion gas.

According to such a configuration, heat released in one of the adjacent heat exchange circuits (positioned upstream of gas direction of the combustion gas) is recovered by the other of the heat exchange circuits (of downstream of the direction). Consequently, such heating apparatus has high heat efficiency.

It is preferable that the heating apparatus further includes a first thermal medium supplying channel and a second thermal medium supplying channel, the first thermal medium supplying channel being one expected to supply water or thermal medium for longer time duration than the second thermal medium supplying channel, the heat exchanging means having at least a first heat exchange circuit and a second heat exchange circuit, the first and second heat exchange circuits being connected to the first and second thermal medium supplying channels, respectively, and the first heat exchange circuit being positioned upstream of the second heat exchange circuit in combustion gas flow.

In such heating apparatus, the heat exchanging means includes a first and a second heat exchange circuits. Herein, the first thermal medium supplying channel connected to the first heat exchange circuit is expected to supply water or thermal medium for longer time duration than the second thermal medium supplying channel connected to the second heat exchange circuit. Thus, in such heating apparatus, the first heat exchange circuit tends to release a relatively large amount of heat.

In such heating apparatus, the first heat exchange circuit having a relatively large amount of heat release is arranged upstream of the second heat exchange circuit in the combustion gas flow. Therefore, the heat released from the first heat exchange circuit is transferred to and recovered by the second heat exchange circuit, so as to be efficiently utilized for heating water or thermal medium. Such heating apparatus has high heat efficiency.

Herein, "the first heat exchange circuit" and "the second heat exchange circuit" respectively have the different concept from "the primary heat exchanger" and "the secondary heat exchanger" described above. For example, as in a preferred embodiment described below, "the secondary heat exchanger" described above may be constituted by "the first heat exchange circuit" and "the secondary heat exchange circuit".

The heat exchangers constituting the heat exchange circuits are preferably arranged so as to thermally contact with one another.

Herein, "to thermally contact" includes not only to directly contact with one another but also to contact by heat conductive materials interposed between the heat exchange circuits. According to such a configuration, the heat released from one of the adjacent heat exchange circuits is recovered by the other of the circuits. Consequently, such heating apparatus has high heat efficiency.

Herein, arrangement of the heat exchangers directly contacted with one another serves for compactification of the apparatus.

It is preferable that the heat exchanger has a receptacle for accommodating the heat receiving tubes, that the receptacle has a gas inlet and a gas outlet for guiding the combustion gas into and out of the receptacle, that the gas outlet is formed in an outlet-forming area predefined on a predetermined face of the receptacle, and that the outlet-forming area is covered with a gas-discharging member to define a space between the outlet-forming area and the gas-discharging member so that the combustion gas discharged from the gas outlet flows into the space.

According to such a configuration the combustion gas discharged through a plurality of gas outlets included in the heat exchanging means is discharged after having flowed into the gas-inflow space formed between the outlet-forming area where the gas outlet is formed and the gas-discharging member. Thus, the combustion gas discharged through each of the gas outlets is diffused within the gas-inflow space and slowly discharged. Consequently, the heating apparatus having little discharging noise is provided.

It is preferable that at least one of the heating systems has in the combustion gas passage a sensible heat exchanging means for transferring mainly sensible heat of the combustion gas to water and a latent heat exchanging means for transferring mainly latent heat of the combustion gas to water, at least one of the sensible and latent heat exchanging means is constituted by a heat exchange circuit having a multi-tube heat exchanger.

As described above, the heating apparatus of the present invention has the compact heat exchanging means each constituted by a multi-tube heat exchanger, and whereby manufacturing cost for the heat exchanging means is inexpensive. The heating apparatus of the present invention has the sensible heat exchanging means and the latent heat exchanging means, at least one of them being constituted by the above-mentioned multi-tube heat exchanger. Consequently, the heating apparatus of the present invention has a compact configuration and has extremely high transfer efficiency of heat energy.

ADVANTAGEOUS EFFECT OF THE INVENTION

The heating apparatus of the present invention has such advantageous effect as high heat exchange efficiency even in small size.

BRIEF DESCRIPTION OF THE DRAWINGS

FIG. 5 is a cross-sectional view of the secondary heat exchanger as taken along A-A of FIG. 3;

THE PREFERRED EMBODIMENTS

Figure 1:
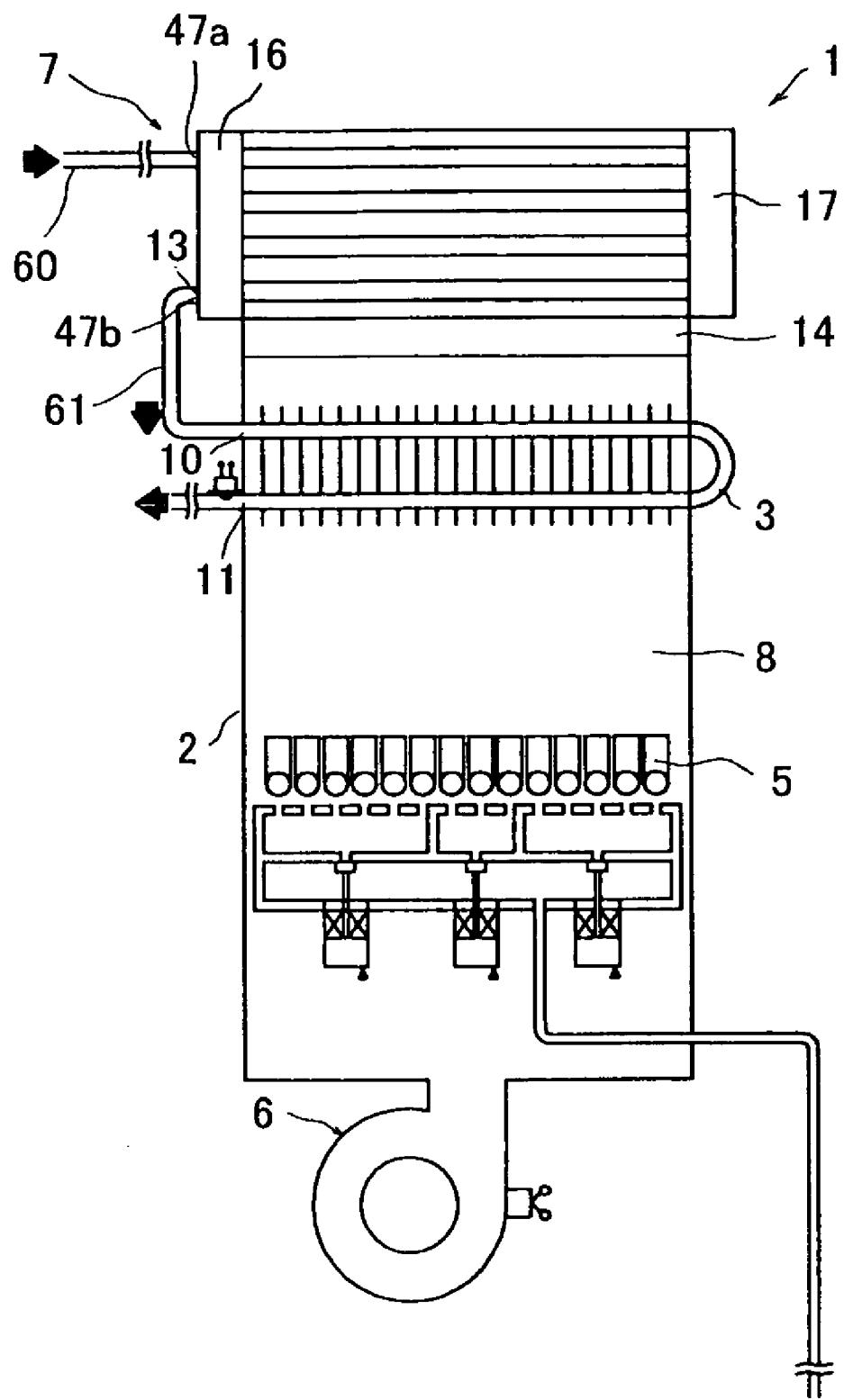
FIG. 1 is a block diagram showing a heating apparatus embodying the present invention.
Figure 2:
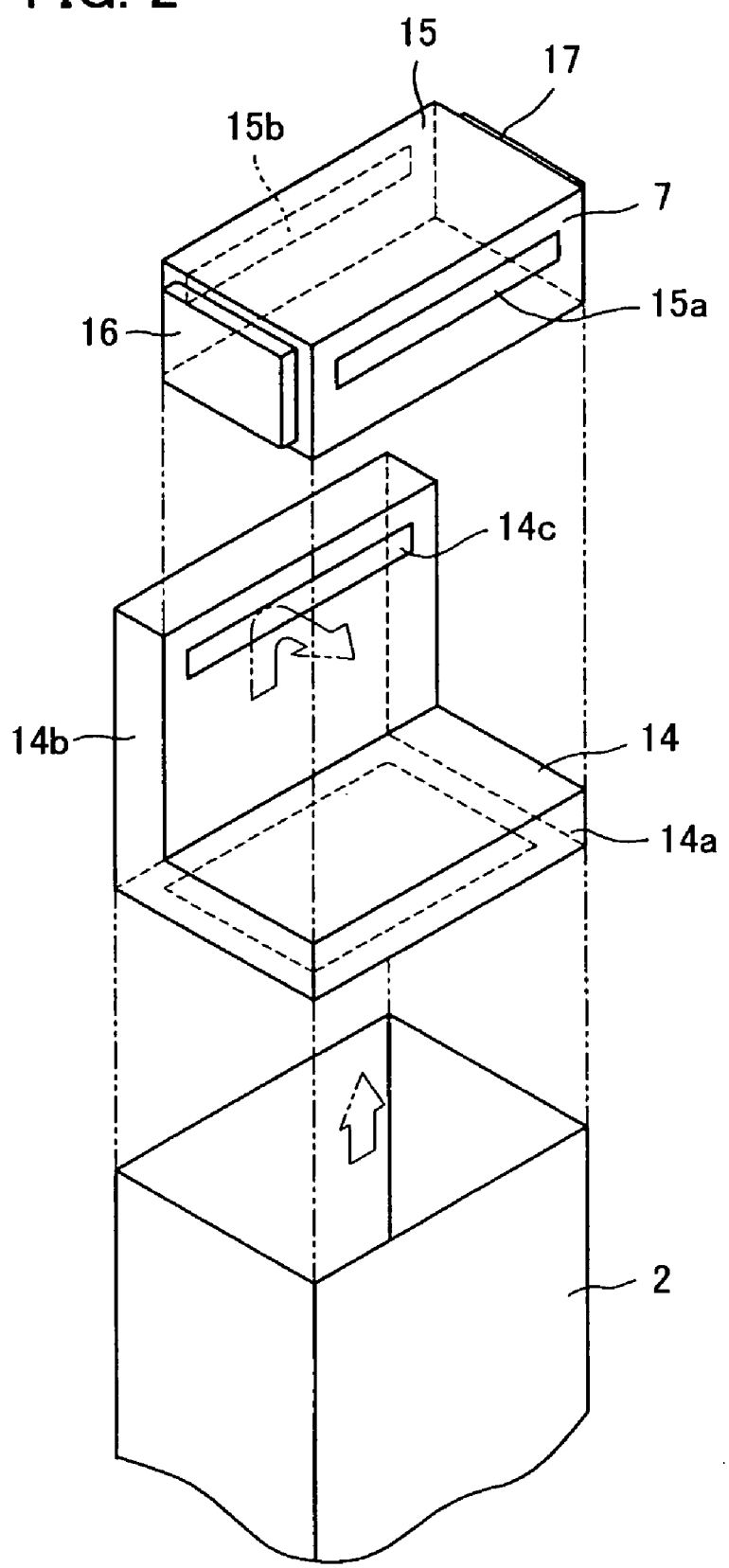
FIG. 2 is an exploded perspective view showing the vicinity of a secondary heat exchanger of the heating apparatus shown in FIG. 1.
Figure 3:
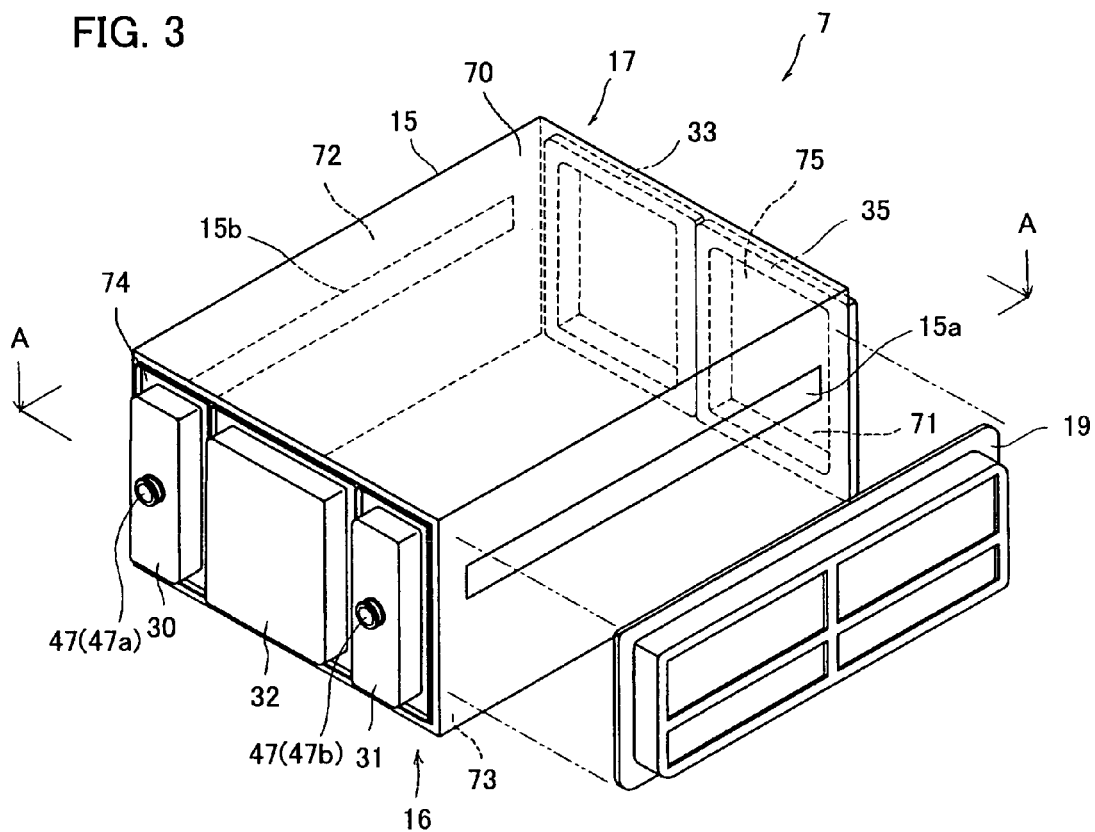
FIG. 3 is a perspective view of the secondary heat exchanger and a gas-discharging member.
Figure 4:
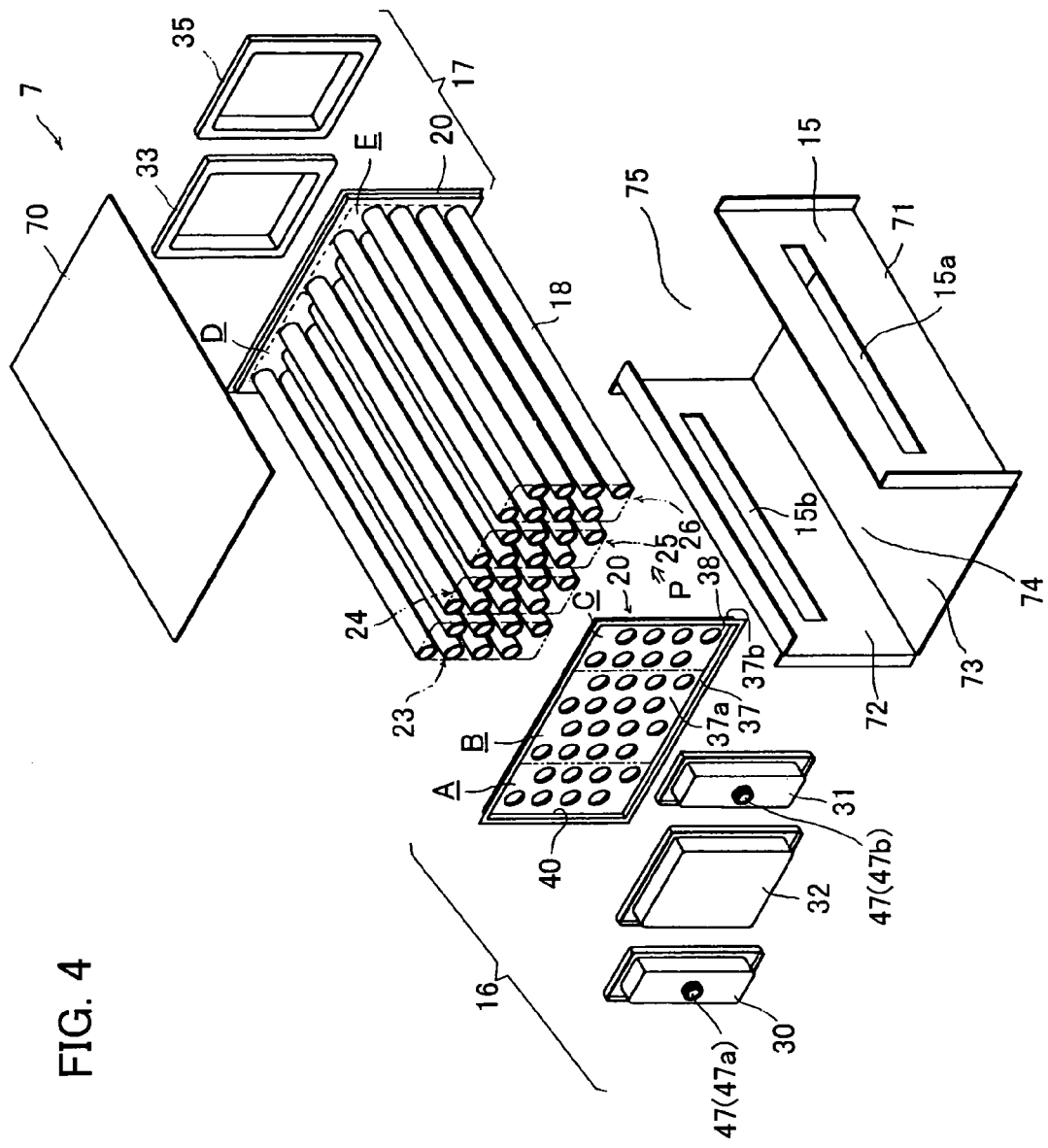
FIG. 4 is an exploded perspective view of the secondary heat exchanger shown in FIG. 3.
Figure 6A:
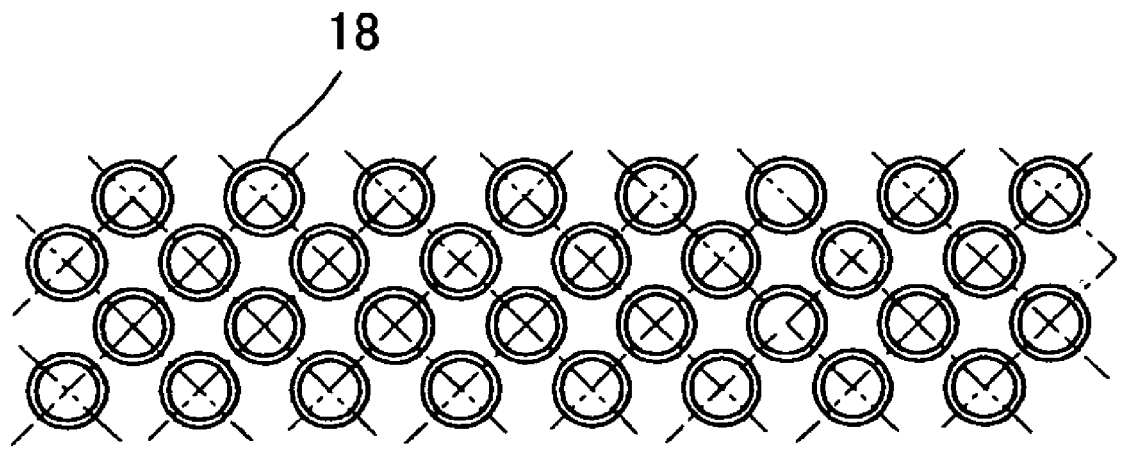
FIG. 6A is a schematic view showing arrangement of heat receiving tubes in the secondary heat exchanger shown in FIG. 3.
Figure 6B:
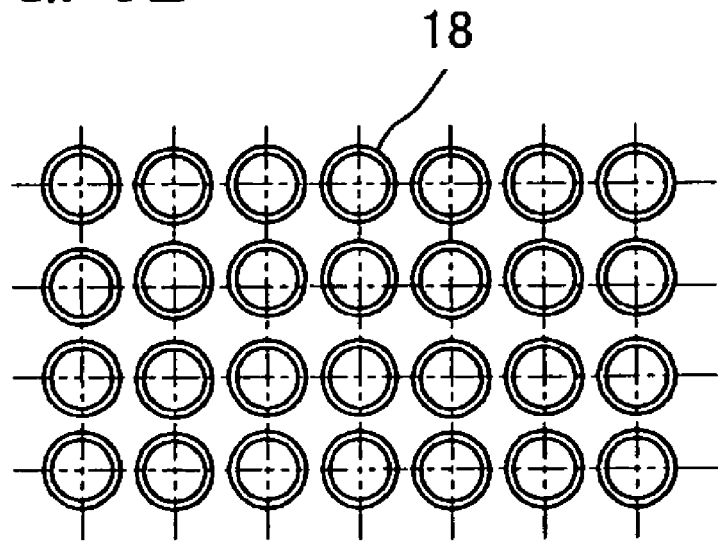
FIG. 6B is a schematic view showing a modified example of arrangement of heat receiving tubes in the secondary heat exchanger shown in FIG. 3.
Figure 7A:
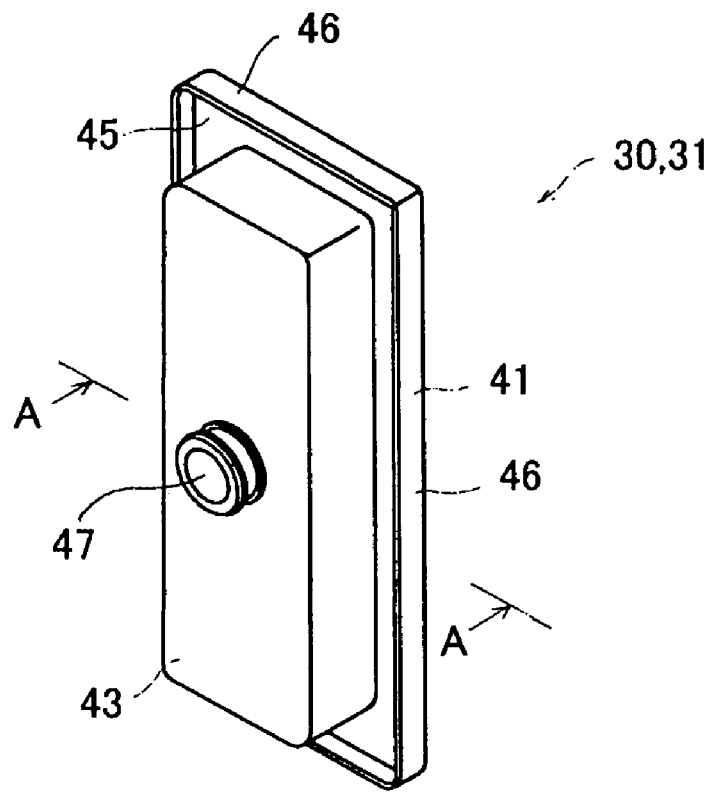
FIG. 7A is a perspective view of a passage-forming member of the secondary heat exchanger shown in FIG. 3.
Figure 7B:
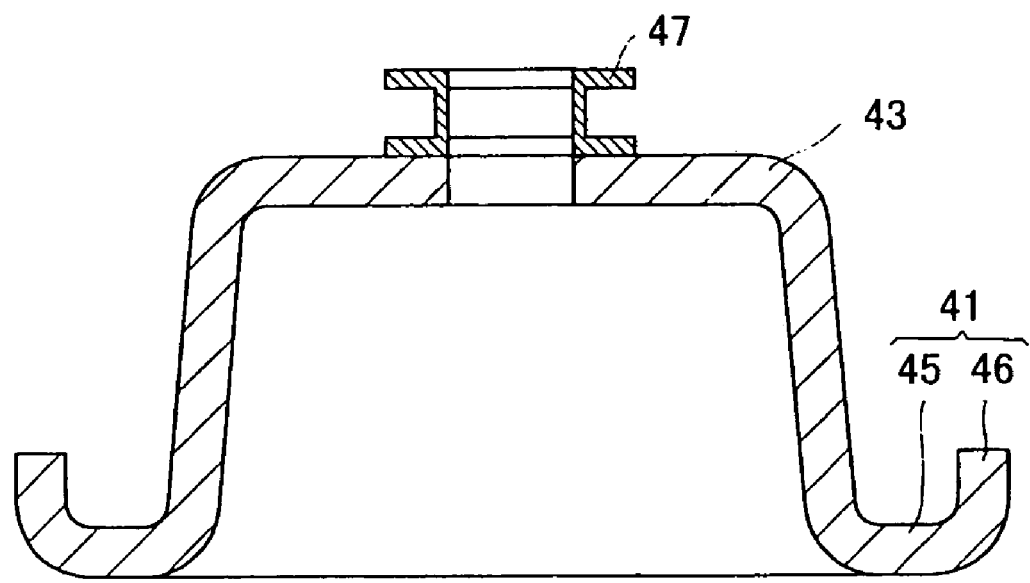
FIG. 7B is a cross-sectional view as taken along A-A of FIG. 7A.
Figure 8A:
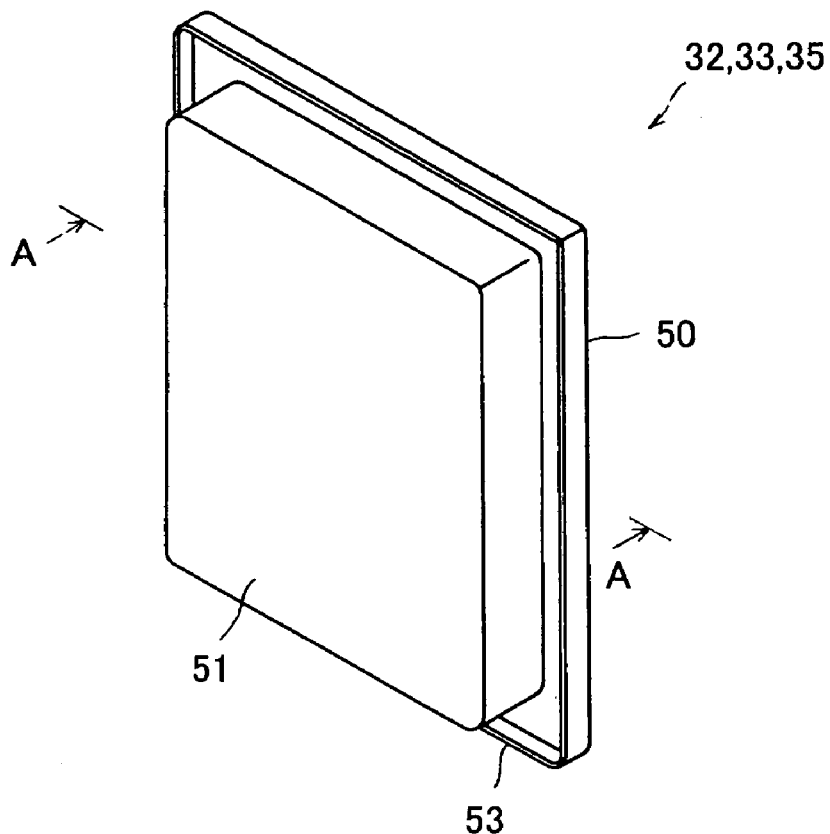
FIG. 8A is a perspective view of another passage-forming member of the secondary heat exchanger shown in FIG. 3.
Figure 8B:
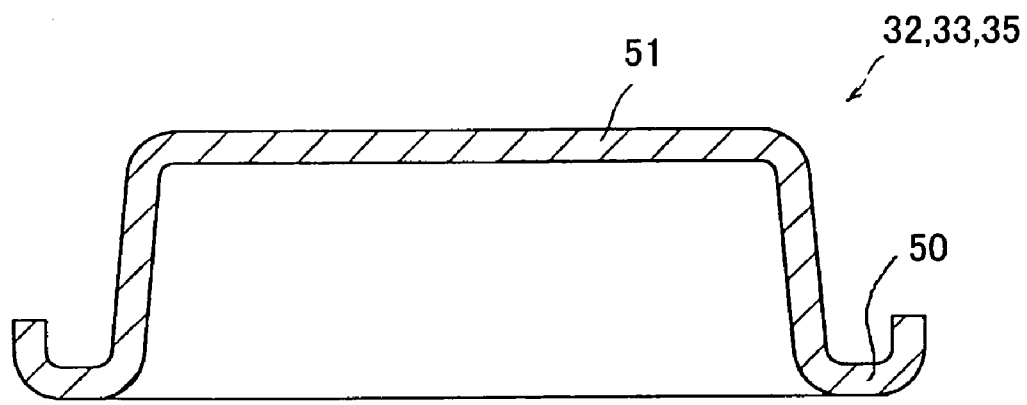
FIG. 8B is a cross-sectional view as taken along A-A of FIG. 8A.
Figure 9:
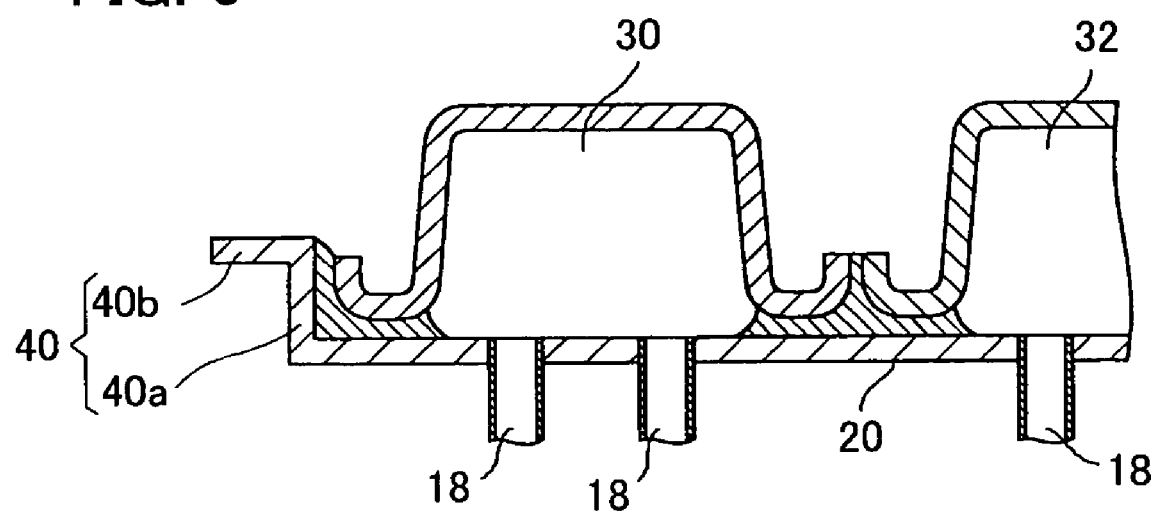
FIG. 9 is a cross-sectional view showing relationship between a passage-forming member and a tube plate in the heat exchanger shown in FIG. 3.
Figure 10:
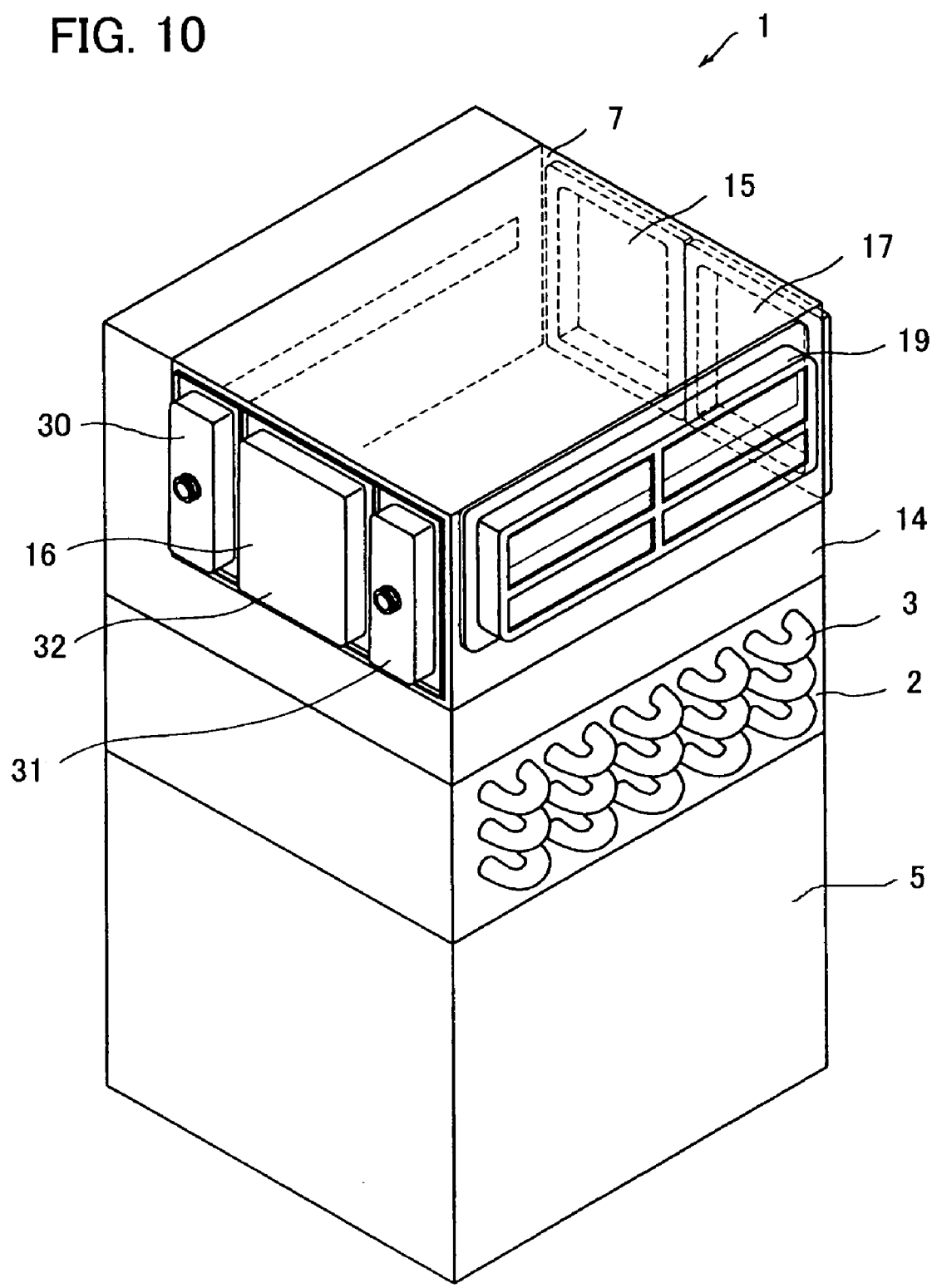
FIG. 10 is an external view of the heating apparatus of the present embodiment.

A combustion-type heating apparatus embodying the present invention will be described below in detail with reference to the accompanying drawings. FIG. 1 is a block diagram showing the heating apparatus of the present embodiment. FIG. 2 is an exploded perspective view showing the vicinity of a secondary heat exchanger of the heating apparatus shown in FIG. 1. FIG. 3 is a perspective view of the secondary heat exchanger and a gas-discharging member. FIG. 4 is an exploded perspective view of the secondary heat exchanger shown in FIG. 3. FIG. 5 is a cross-sectional view of the secondary heat exchanger as taken along A-A of FIG. 3. FIG. 6A is a schematic view showing arrangement of heat receiving tubes in the secondary heat exchanger shown in FIG. 3. FIG. 6B is a schematic view showing a modified example of arrangement of heat receiving tubes in the secondary heat exchanger shown in FIG. 3. FIGS. 7A and 8A each are a perspective view of a passage-forming member of the secondary heat exchanger shown in FIG. 3. FIGS. 7B and 8B are cross-sectional views as taken along A-A of FIGS. 7A and 8A respectively. FIG. 9 is a cross-sectional view showing relationship between a passage-forming member and a tube plate in the heat exchanger shown in FIG. 3. FIG. 10 is an external view of the heating apparatus of the present embodiment.

Referring to FIG. 1, the numeral 1 denotes the combustion-type heating apparatus of the present embodiment. The heating apparatus 1 consists mainly of a shell 2, a primary heat exchanger (sensible heat exchanger) 3, a burner (combustion means) 5, and a fan 6. Further, a secondary heat exchanger (latent heat exchanger) 7 mainly for collection (recovery) of latent heat from combustion gas is arranged downstream (on the upper side in FIG. 1) of a combustion gas passage 8 in relation to the primary heat exchanger 3.

The primary heat exchanger 3 is a so-called fin-and-tube heat exchanger mainly made of copper. The primary heat exchanger 3 is arranged within the combustion gas passage 8 where high-temperature combustion gas generated in the burner 5 flows. The primary heat exchanger 3 functions as a sensible heat exchanger mainly for collection (recovery) of sensible heat of the combustion gas, so as to heat water flowing therewithin.

The primary heat exchanger 3 has a water inlet 10 and a water outlet 11, the former being connected to a water outlet 13 of the secondary heat exchanger 7. Water after heat exchange in the secondary heat exchanger 7 flows into the primary heat exchanger 3.

The primary heat exchanger 3 exchanges heat with combustion gas flowing in the passage 8 within the shell 2 accommodating the burner 5. The water outlet 11 has a load terminal such as a heater or a hot-water tap (not shown) connected thereto.

The secondary heat exchanger 7, as shown in FIGS. 1 and 2, is connected to the shell 2 via a connecting member 14. Referring to FIG. 2, the connecting member 14 is constituted by a meeting portion 14a connected to an opening of the shell 2 and a connecting portion 14b arranged in a substantially L shape, and forms a communicating passage therewithin. The connecting portion 14b has a surface contact with a back face of a casing (body) 15 of the secondary heat exchanger 7, so as to become airtight, and has an opening 14c for introducing the combustion gas into the casing 15.

Referring to FIGS. 3 and 4, the secondary heat exchanger 7 is constituted by the casing 15 of a hollow box shape with headers 16 and 17 arranged in parallel at both ends thereof, to which a number of heat receiving tubes 18 are fixed by brazing.

The casing 15 is a member made of a metal plate bent to be formed into a square U shape as shown in FIG. 4, to which a top plate 70 is attached so as to make up a box shape as shown in FIG. 3. The casing 15 includes the top plate (top face) 70, a front face 71, a back face 72, a bottom face 73, and side portions 74 and 75, the side portions 74 and 75 being open. The side portions 74 and 75 is sealed by the headers 16 and 17 as described below. The casing 15 has a gas outlet (gas-discharging portion) 15a at its front face and a gas inlet 15b at its back face.

The gas outlet 15a is an opening for discharging combustion gas from the secondary heat exchanger 7, mounted with a gas-discharging member 19 in the form of a window frame having four openings at its front face, as shown in FIG. 3. The gas inlet 15b is adapted to introduce combustion gas passing through the primary heat exchanger 3 into the secondary heat exchanger 7, and formed at a position corresponding to the opening 14c of the connecting member 14 when the secondary heat exchanger 7 is connected to the shell 2 via the connecting member 14. The combustion gas introduced from the inlet 15b passes through gaps among a number of heat receiving tubes 18 across the inside of the casing 15 to exchange heat with water within the heat receiving tubes 18. The combustion gas having exchanged heat with the water within the heat receiving tubes 18 is discharged out of the secondary heat exchanger 7 through the outlet 15a.

The heat receiving tubes 18 are tube bodies made of metal and are arranged in parallel with making gaps among one another so that the combustion gas is passable therethrough. Inside the secondary heat exchanger 7, the water flowing in each of the heat receiving tubes 18 is turned at the headers 16 and 17 and discharged after reciprocation relative to the casing 15. The heat receiving tubes 18 employed in the present embodiment are made of a high corrosive-resistant material such as stainless steel, and further are bare tubes without fins.

The heat receiving tubes 18 constituting the secondary heat exchanger 7 are arranged in four columns (in a vertical direction) and in eight rows (in a horizontal direction) in the casing 15. In the present embodiment, the heat receiving tubes 18 of the secondary heat exchanger (latent heat exchanger) 7 make up a three-dimensional structure in which the tubes 18 are arranged vertically and horizontally in columns and rows, with the number of columns (in a vertical direction) being less than the number of rows (in a horizontal direction). Herein, it is preferable that the number of columns is half of the number of rows or less.

Seen from an angle P of FIG. 4, the secondary heat exchanger 7 has such a configuration that the heat receiving tubes 18 are arranged in staggered rows as shown in FIG. 6A. The heat receiving tubes 18 are preferably arranged in staggered rows as shown in FIG. 6A, but may be arranged in matrix as shown in FIG. 6B.

The tubes 18 arranged in the casing 15 are divided into four groups, the tubes 18 in the first and second rows from the gas inlet 15b constituting an upstream group of heat receiving tubes 23, the tubes 18 in the third through the sixth rows adjacent thereto and constituting midstream groups of heat receiving tubes 24 and 25, and the tubes in the seventh and eighth rows from the gas inlet 15b, or in the first and second rows from the gas outlet 15a, constituting a downstream group of heat receiving tubes 26.

Referring to FIGS. 3, 4, and 5, the header 16 is constituted in such a manner that three passage-forming members (end chamber members) 30, 31, and 32, each of a flanged tray or trough, are fixed side-by-side to a tube plate 20 by brazing. The header 17 is constituted in such a manner that two passage-forming members (end chamber members) 33 and 35, each of a flanged tray or trough, are fixed side-by side to another tube plate 20 by brazing.

The tube plates 20 each are made of metal and have a number of tube insertion holes 38 on a fixing surface 37a of a flat plate portion 37 in conformity with arrangement of the heat receiving tubes 18 with four sides bent to form a step portion 40. The step portion 40 protrudes toward fixing side of the passage-forming members 30, 31, and 32, or a fixing surface 37b of the flat plate portion 37. The flat plate portion 37 of the tube plate 20 of the header 16 is roughly divided into three areas: an area A to which the upstream group 23 of tubes is connected, an area B to which the midstream groups 24 and 25 of tubes are connected, and an area C to which the downstream group 26 of tubes is connected. Further, the flat plate portion 37 of the tube plate 20 of the header 17 is roughly divided into two areas: an area D to which the upstream and midstream groups 23 and 24 are connected and an area E to which the midstream and downstream groups 25 and 26 are connected. The tube plates 20 are, as shown in FIG. 4, fixed by brazing to the both openings of the casing 15 so as to seal the openings to make airtight. Consequently, the side portions 74 and 75 of the casing 15 are sealed by the tube plates 20 of the headers 16 and 17.

The passage-forming members 30, 31 for forming an inflow or outflow chamber are brazed so as to cover the area A, C of the above-mentioned fixing surface 37b, respectively. An inflow chamber 36 and an outflow chamber 39 are, as shown in FIG. 5, respectively formed between the members 30 and 31 and the fixing surface 37b of the tube plate 20. Referring to FIGS. 7A and 7B, the passage-forming members 30 and 31 have the same size and shape each other and each have a flange 41 and a water chamber 43 whose opening is surrounded by the flange 41. The flange 41 has a parallel portion 45 fixed substantially in parallel to the flat plate portion 37 of the tube plate 20 by brazing and a skirt portion 46 where the outer periphery of the parallel portion 45 is folded up substantially orthogonally toward a direction in which the water chamber 43 protrudes.

The water chamber 43 has a connecting port 47 for communicating inside and outside of the inflow chamber 36 and the outflow chamber 39 of and for connecting a pipe. The connecting port 47 of the passage-forming member 30 functions as a water inlet 47a for supplying water to the secondary heat exchanger 7 from outside, whereas the other connecting port 47 of the passage-forming member 31 functions as a water outlet 47b for discharging water heat-exchanged by the secondary heat exchanger to outside.

The passage-forming members 32, 33, and 35 for forming flow-turnaround chambers, as shown in FIGS. 8A and 8B, have a structure similar to the above-mentioned members 30 and 31 and have the same size and shape one another. The members 32, 33, and 35 each have a flange 50 of the same shape as the flanges 41 of the members 30 and 31 and a water chamber 51, whose opening is surrounded by the flange 50, wider than the water chambers 43 of the members 30 and 31.

Referring to FIG. 5, the member 32 forms a midstream flow-turnaround chamber 55 by the water chamber 51 covering substantially all of the area B positioned in the central part of the tube plate 20 of the header 16, whereas the members 33 and 35 form an upstream flow-turnaround chamber 56 and a downstream flow-turnaround chamber 57 by the water chambers 51 and 51 covering substantially all of the areas D and E of the tube plate 20 of the header 17, respectively.

The water inlet 47a formed at the passage-forming member 30 has a water-supply pipe 60 for supplying water from outside connected thereto, whereas the water outlet 47b formed at the passage-forming member 31 has a connecting pipe 61 for connecting the secondary heat exchanger 7 and the primary heat exchanger 3. In the secondary heat exchanger 7, water passages constituted by the upstream group 23 of tubes, the midstream groups 24 and 25 of tubes, and the downstream group 26 of tubes are communicated mutually by the passage-forming members 32, 33, and 35 fixed by brazing to the tube plates 20 and 20 of the headers 16 and 17. That communicates the water inlet 47a to the water outlet 47b, thereby making up a unitary passage within the casing 15 in which water flows in turning flow direction.

The heating apparatus 1 of the present embodiment has an external configuration as shown in FIG. 10 and has the burner 5 at the lower part of the shell 2, the primary heat exchanger (sensible heat exchanger) 3 at the upper part of the shell 2, the connecting member 14 at the top of the shell 2, on which member 14 the secondary heat exchanger 7 is placed.

In the present embodiment, the casing 15 and the headers 16 and 17 of the secondary heat exchanger 7 constitute parts of an outer wall. That reduces the number of components of the heating apparatus 1 of the present embodiment, thereby facilitating the assembly. Herein, in the present embodiment, the passage-forming members 30, 31, 32, 33, and 35 of the headers 16 and 7 of the secondary heat changer 7 are formed at the outer sides of the combustion gas passage 8. The combustion gas passage 8 is formed as a unitary combustion gas passage extending from the burner 5 to the gas-discharging member 19 within the heating apparatus 1.

More specifically, the combustion gas passage 8 from the burner 5 to the connecting member 14 is formed by the interior space of the shell 2. The passage 8 within the connecting member 14 is defined by the connecting member 14 itself. The passage 8 from the connecting member 14 to the gas-discharging member 19 is defined by the secondary heat exchanger 7 itself.

The secondary heat exchanger 7 has the casing 15, which encloses the top, front, back, and bottom faces thereof. Meanwhile, the side portions 74 and 75 of the casing 15 are sealed by the tube plates 20 and 20 of the headers 16 and 17. Therefore, the secondary heat exchanger 7 is enclosed on six faces except the gas inlet 15b and the gas outlet 15a, so that its interior space functions as the combustion gas passage 8.

In this way, in the heating apparatus of the present embodiment, the tube plates 20 and 20 of the headers 16 and 17 constitutes part of the walls of the combustion gas passage 8.

In the present embodiment, the heat receiving tubes 18 are densely arranged in the combustion gas passage 8 because the tube plates 20 and 20 of the headers 16 and 17 constitute part of the walls of the passage 8. Specifically, the secondary heat exchanger 7 has a plurality of the heat receiving tubes 18 arranged in parallel between a pair of the headers 16 and 17, and in the present embodiment, the heat receiving tubes 18 are fixed to the tube plates 20 and 20. Further, in the present embodiment, as the tube plates 20 and 20 to which the heat receiving tubes 18 are fixed constitute the two side walls of the passage 8, the tubes 18 penetrate the both side walls of the passage 8. Thereby, the heat receiving tubes 18 pass transversely across the combustion gas passage 8, so as to have large area within the passage.

Next, flow of water in the heating apparatus 1 of the present embodiment will be described below.

Water supplied from outside through the water-supply pipe 60, as indicated by arrows in FIG. 5, flows from the water inlet 47a of the secondary heat exchanger 7 into the inflow chamber 36 of the header 16. The water passes through the inflow chamber 36, flowing into each of the tubes 18 constituting the upstream group 23, and flowing toward the header 17. The water flowing in the upstream group 23 flows into the upstream flow-turnaround chamber 56 to change its flow direction, flowing into each of the tubes 18 of the midstream group 24 opened within the upstream flow-turnaround chamber 56. Thereafter, in a similar manner, the water flows in each of the tubes 18 constituting the midstream and downstream groups 25 and 26 in turning its flow direction within the midstream and downstream flow-turnaround chambers 55 and 57, flowing into the outflow chamber 39. The water flowing in each of the tubes 18 is heated by heat exchange with combustion gas introduced into the casing 15. The water having reached the outflow chamber 39 is discharged from the water outlet 47b out of the secondary heat exchanger 7 to be supplied to the primary heat exchanger 3 through the connecting pipe 61. The water introduced into the primary heat exchanger 3 is heated by heat exchange with high-temperature combustion gas flowing in the combustion gas passage 8, so as to be supplied to a hot-water tap or a load terminal (not shown) through the water outlet 11.

Next, flow of combustion gas in the heating apparatus 1 of the present embodiment will be described below.

Combustion gas generated in accordance with combustion of the burner 5 flows downstream, that is, upward in the combustion gas passage 8 within the shell 2. The high-temperature combustion gas generated in the burner 5 passes through the primary heat exchanger 3 placed within the passage 8, so as to heat water flowing in the primary heat exchanger 3. The combustion gas that has transferred mainly its sensible heat to the water in the primary heat exchanger 3 reaches the connecting member 14 positioned at the most downstream of the passage 8.

The combustion gas having passed through the primary heat exchanger 5 meets in the meeting portion 14a of the connecting member 14, passing through the gas inlet 15b connected to the opening 14c of the connecting portion 14b in an airtight condition, flowing into the secondary heat exchanger 7. Within the secondary heat exchanger 7, the combustion gas horizontally (transversely) flows through the gas inlet 15b positioned at the back face of the casing 15 toward the gas outlet (gas-discharging portion) 15a positioned at the front face of the casing 15. In contrast, in the secondary heat exchanger 7, a plurality of the heat receiving tubes 18 are fixed in parallel to the headers 16 and 17 positioned at the both sides of the casing 15, with the result that the combustion gas flows among a plurality of the tubes 18 arranged in parallel so as to pass across the tubes 18. Thereby, in the secondary heat exchanger 7, mainly latent heat of the combustion gas is transferred (recovered) to the water flowing in the tubes 18 and drain generated on the surfaces of the tubes 18 is removed from the tubes 18 by air blow of the combustion gas.

Thereafter, the combustion gas reaches the gas outlet 15a positioned at the front face of the secondary heat exchanger 7, being discharged out of the casing 15.

In the heating apparatus 1 of the present embodiment, as the tube plates 20 and 20 of the headers 16 and 17 constitute the both side walls of the passage 8 and a plurality of the heat receiving tubes 18 are arranged in parallel between the tube plated 20 and 20, the heat receiving tubes 18 are densely accommodated in the combustion gas passage 8. That increases contacts of the combustion gas with the surfaces of the tubes 18, thereby achieving high heat exchange efficiency.

Further, as described above, as latent heat of the combustion gas is collected by the secondary heat exchanger 7, water vapor within the combustion gas is condensed, thereby generating drain. The drain is generated on the surfaces of the tubes 18. However, the tubes employed in the present embodiment are bare tubes without projections such as fins, and therefore have no space into which the drain gets. Thus, the heat receiving tubes 18 employed in the present embodiment avoid retaining the drain thereon.

In the heating apparatus 1 of the present embodiment, the heat receiving tubes 18 are arranged across flow of the combustion gas. Thus, the combustion gas blows away the drain adhered to the tubes 18, thereby avoiding retaining the drain.

Further, the drain generated on the tubes 18 placed at the upper columns may fall onto the tubes 18 placed at the lower columns, but in the heating apparatus 1 of the present invention, as the number of columns (in a vertical direction) is less than the number of rows (in a horizontal direction), the drain falling onto the tubes 18 placed at the lower columns is small in amount.

The heating apparatus 1 of the present embodiment has high heat exchange efficiency because the drain adhered to the tubes 18 is small in amount in this way. The heating apparatus achieves high heat efficiency and energy saving due to high heat exchange efficiency of the secondary heat exchanger 7.

The present invention is applied to the above-mentioned embodiment having a configuration with the burner 5 positioned at the bottom and the heat exchangers (the primary and secondary heat exchangers 3 and 7) positioned over them, but it is possible to apply the present invention to a combustion-type heating apparatus having a configuration with the heat exchangers positioned under the burner 5.

However, it is much more effective in the present invention to employ the configuration with the heat exchangers over the burner 5 as shown in the embodiment than to employ such a configuration just described. According to such configuration, the combustion gas flows in a gravitational direction, that is, in a forward direction relative to a falling direction of drain. That makes it relatively easy to remove the drain, thereby having little bad effect by the drain. In contrast, according to the configuration with the heat exchangers over the burner 5, the conventional configuration makes the combustion gas to flow in a direction opposite to the falling direction of drain, causing easy adhering of the drain, but the present invention facilitates smooth discharge of drain.

The blazed structure illustrates the above-mentioned embodiment by an example of the structure of the headers 16 and 17, but the present invention is not limited to such a structure, and may have a screwed structure or a riveted structure. In the case of employing the screwed structure or the riveted structure, a packing is used at the same time.

Now, a preferred embodiment of a heating apparatus provided with a plurality of functions such as a hot-water supply function and an air heating function or a function of heating water of the bath again is described below.

Figure 11:
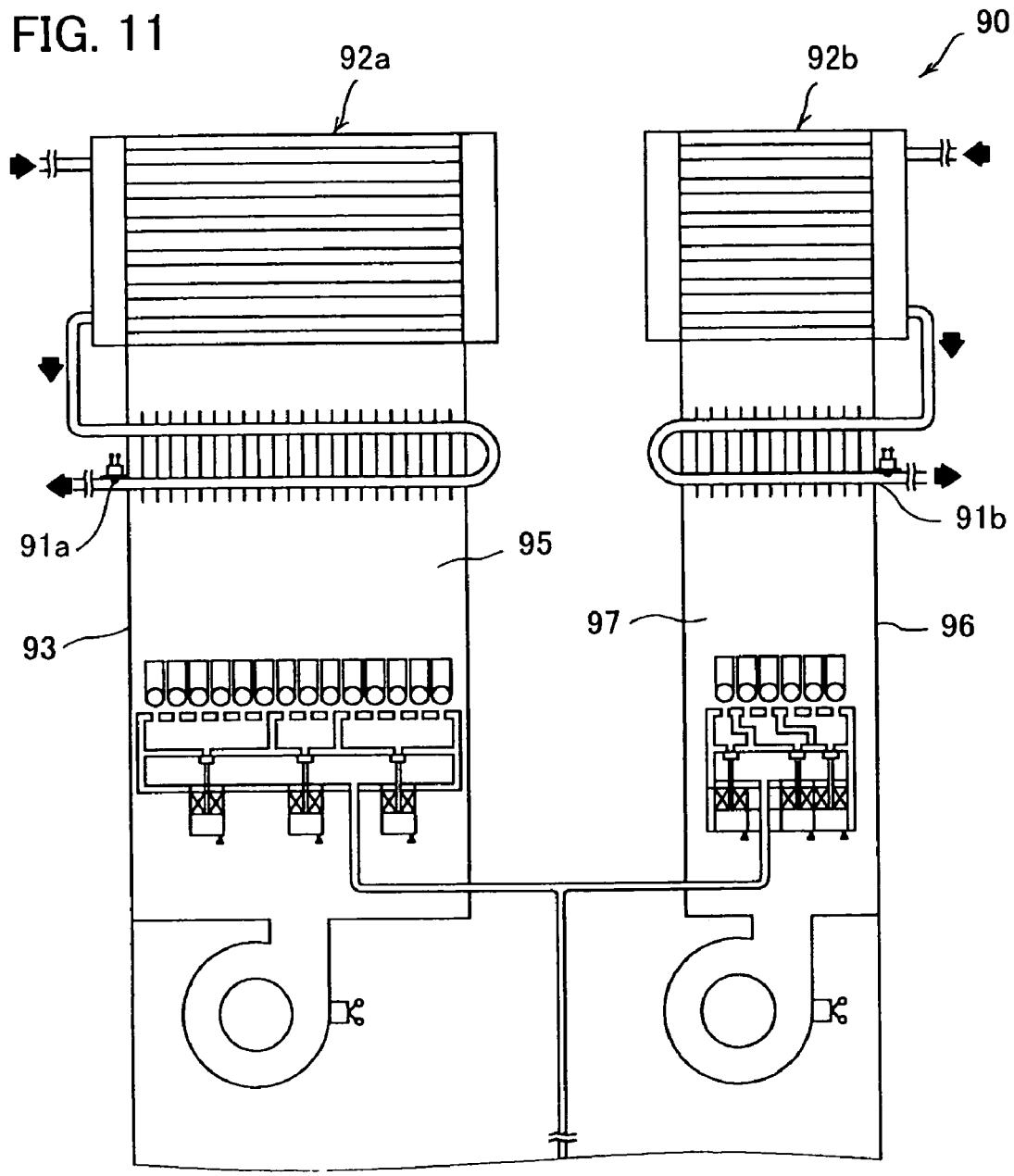
FIG. 11 is a schematic view of operating principle of a heating apparatus experimentally made by the present inventor.

FIG. 11 is a schematic view of operating principle of a heating apparatus experimentally made by the present inventor. Referring to FIG. 11, the present inventor has experimentally made a heating apparatus 90 with two burners and two water passages having two separate systems composed of two sensible heat exchanging means 91a and 91b and two separate systems composed of latent heat exchanging means 92a and 92b, the latent heat exchanging means 92a and 92b employing a multi-tube heat exchanger provided with a number of heat receiving tubes. The heat exchanging means 92a is arranged so as to extend over only a combustion gas passage 95 of one shell 93, whereas the heat exchanging means 92b, separated from the heat exchanging means 92a, is arranged so as to extend over only a combustion gas passage 97 of another shell 96.

A combustion experiment is carried out on the heating apparatus 90 employing the multi-tube heat exchangers such as the latent heat exchanging means 92a and 92b described above. It is revealed by the experiment that heat exchange efficiency equal to the case of employing a plate-fin heat exchanger can be obtained, but a number of heat receiving tubes are required for that. Specifically, as described above, in the case of employing a multi-tube heat exchanger for collection (recovery) of latent heat, it is necessary to enlarge the total contacting area of heat receiving tubes and combustion gas by arranging a number of the heat receiving tubes in order to improve heat exchange efficiency. Thus, such a configuration as the heating apparatus 90 needs to fix a number of heat receiving tubes to a header by brazing, resulting in a difficulty of miniaturization of a heat exchanger or little savings of manufacturing cost compared to the case of employing another type of heat exchanger such as a plate-fin heat exchanger.

Figure 12:
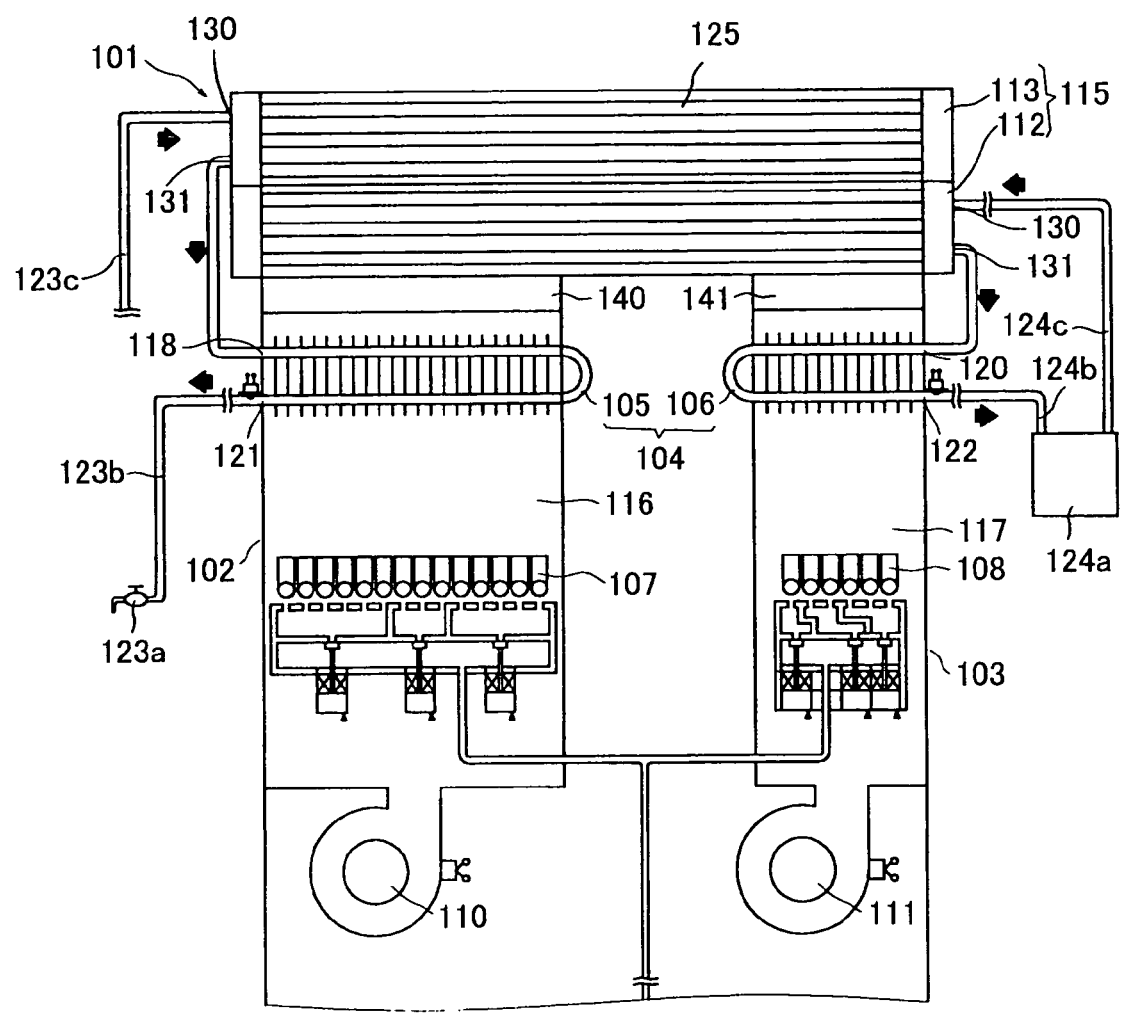
FIG. 12 is a schematic view of operating principle of a heating apparatus embodying the present invention.
Figure 13A:
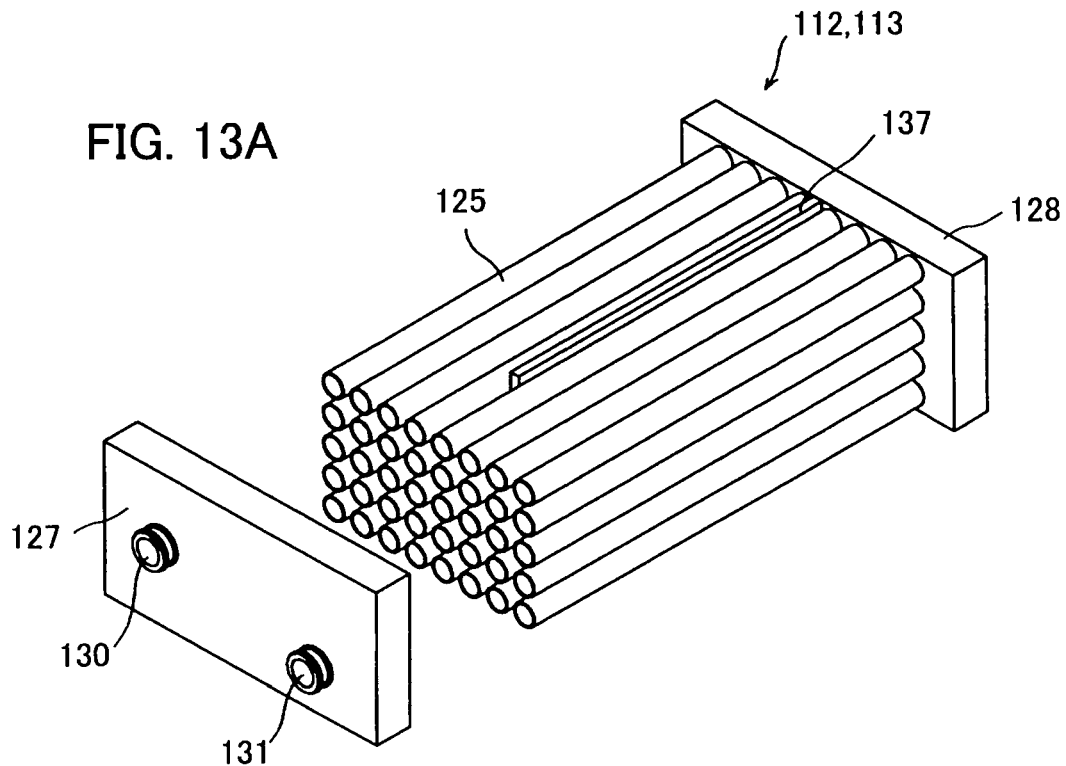
FIG. 13A is an exploded perspective view of a secondary heat exchanger for latent heat employed in the heating apparatus shown in FIG. 12.
Figure 13B:
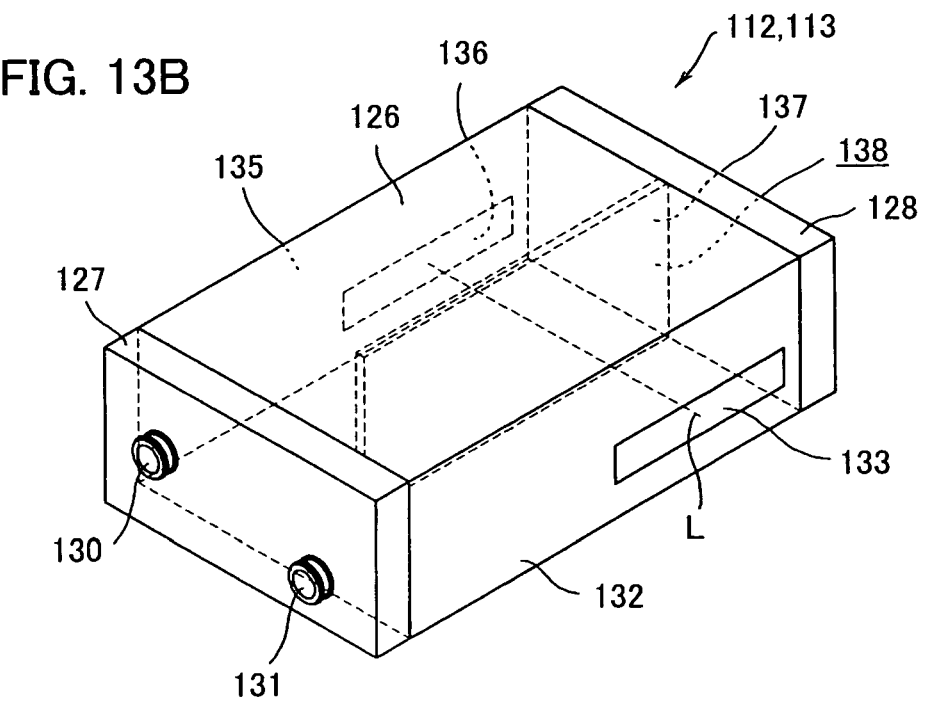
FIG. 13B is a perspective view of the secondary heat exchanger shown in FIG. 13A.
Figure 14:
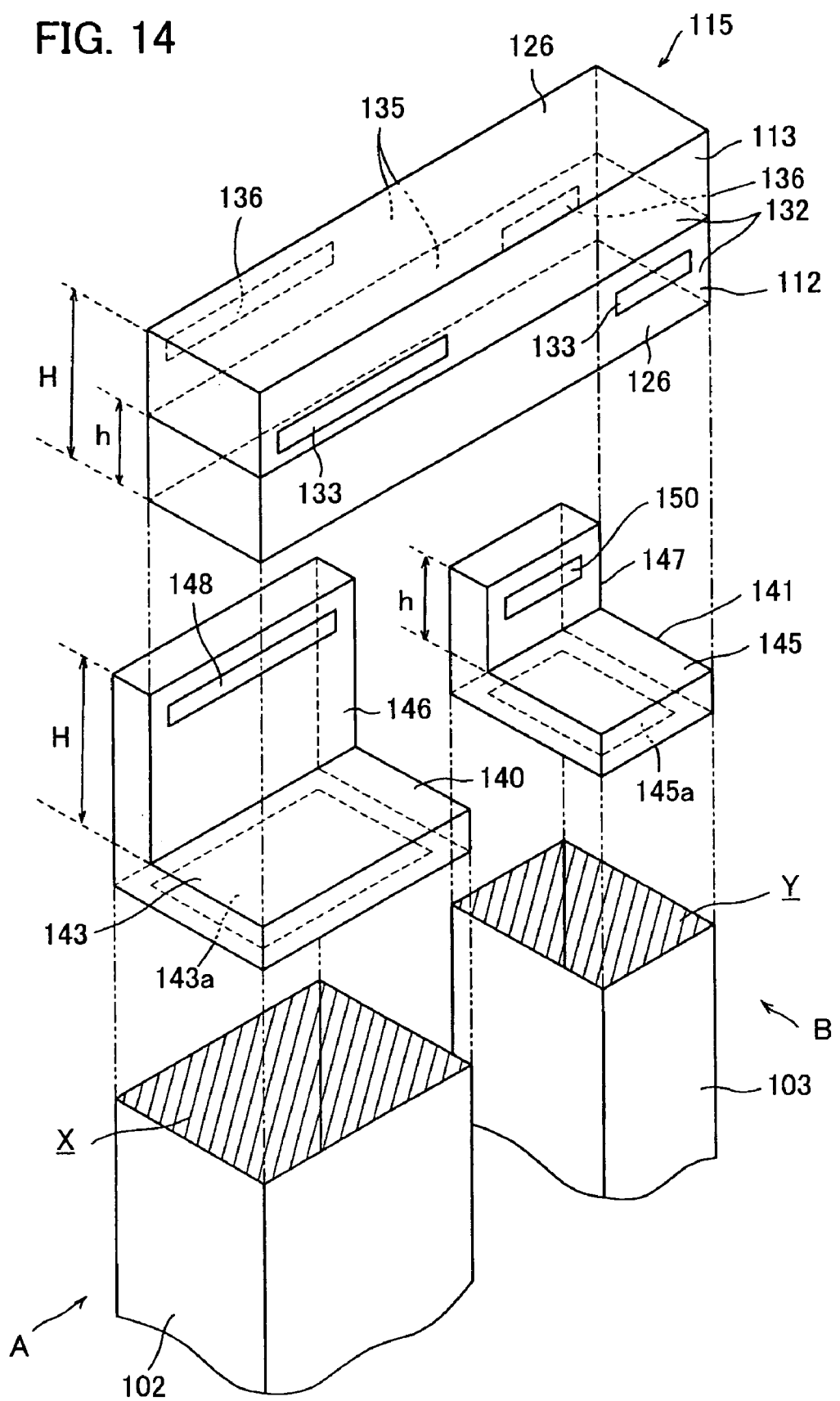
FIG. 14 is an exploded perspective view showing the vicinity of the secondary heat exchanger of the heating apparatus shown in FIG. 12.
Figure 15A:
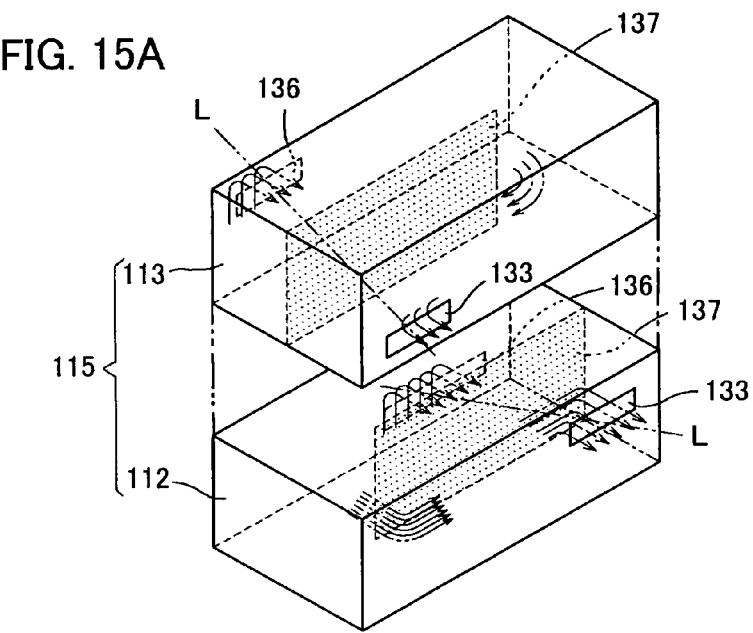
FIG. 15A is a schematic view showing combustion gas flow in a latent heat exchanging means employed in the heating apparatus shown in FIG. 12.
Figure 15B:
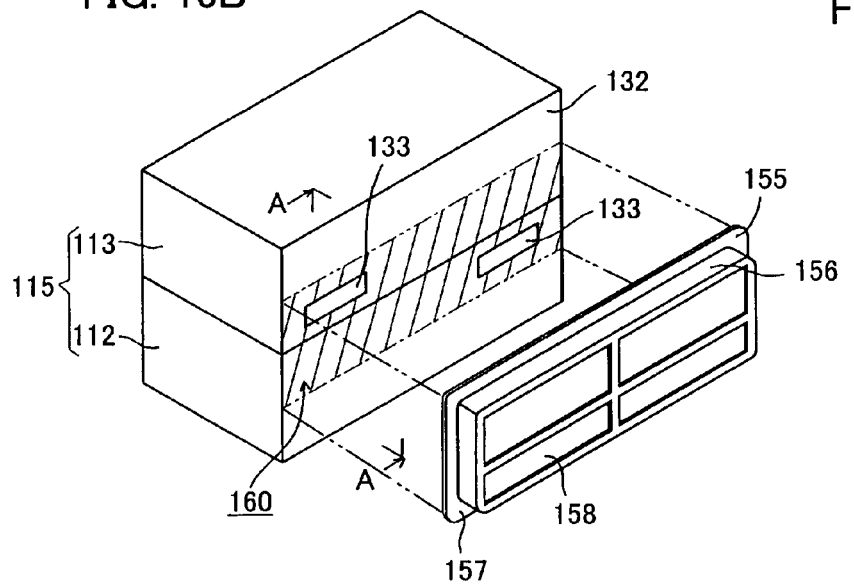
FIG. 15B is an exploded perspective view of the above-mentioned latent heat exchanging means and a gas-discharging member.
Figure 15C:
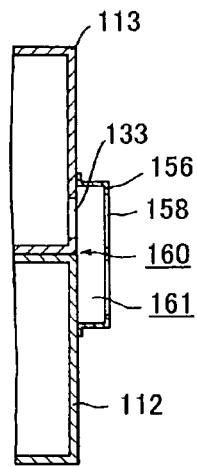
FIG. 15C is a cross-sectional view as taken along A-A of FIG. 15B.
Figure 16A:
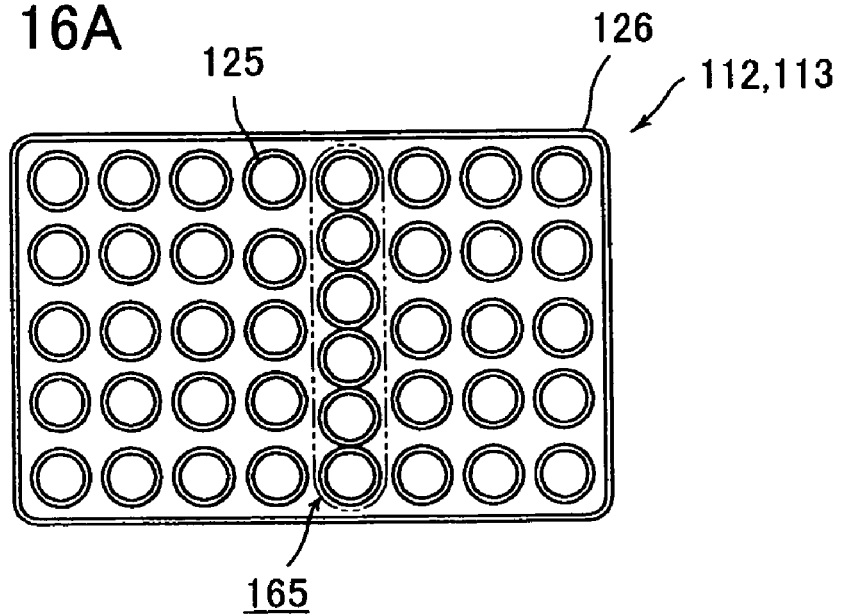
FIG. 16A is a cross-sectional view of a modified example of the secondary heat exchanger shown in FIG. 13.
Figure 16B:
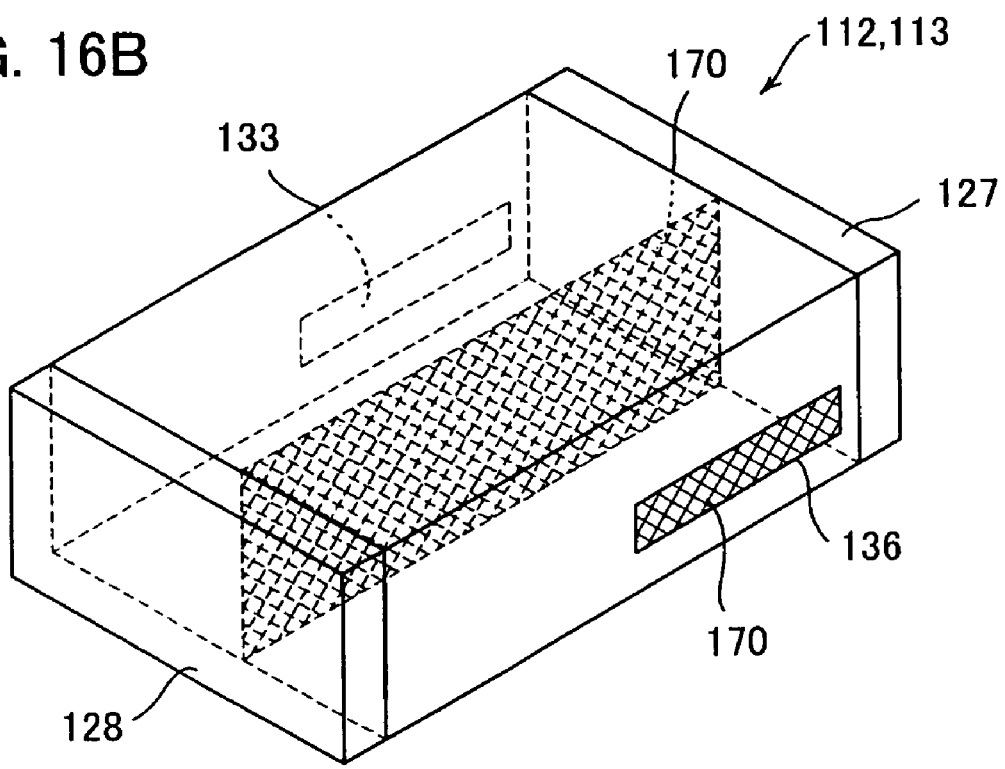
FIG. 16B is a perspective view of another modified example thereof.
Figure 17:
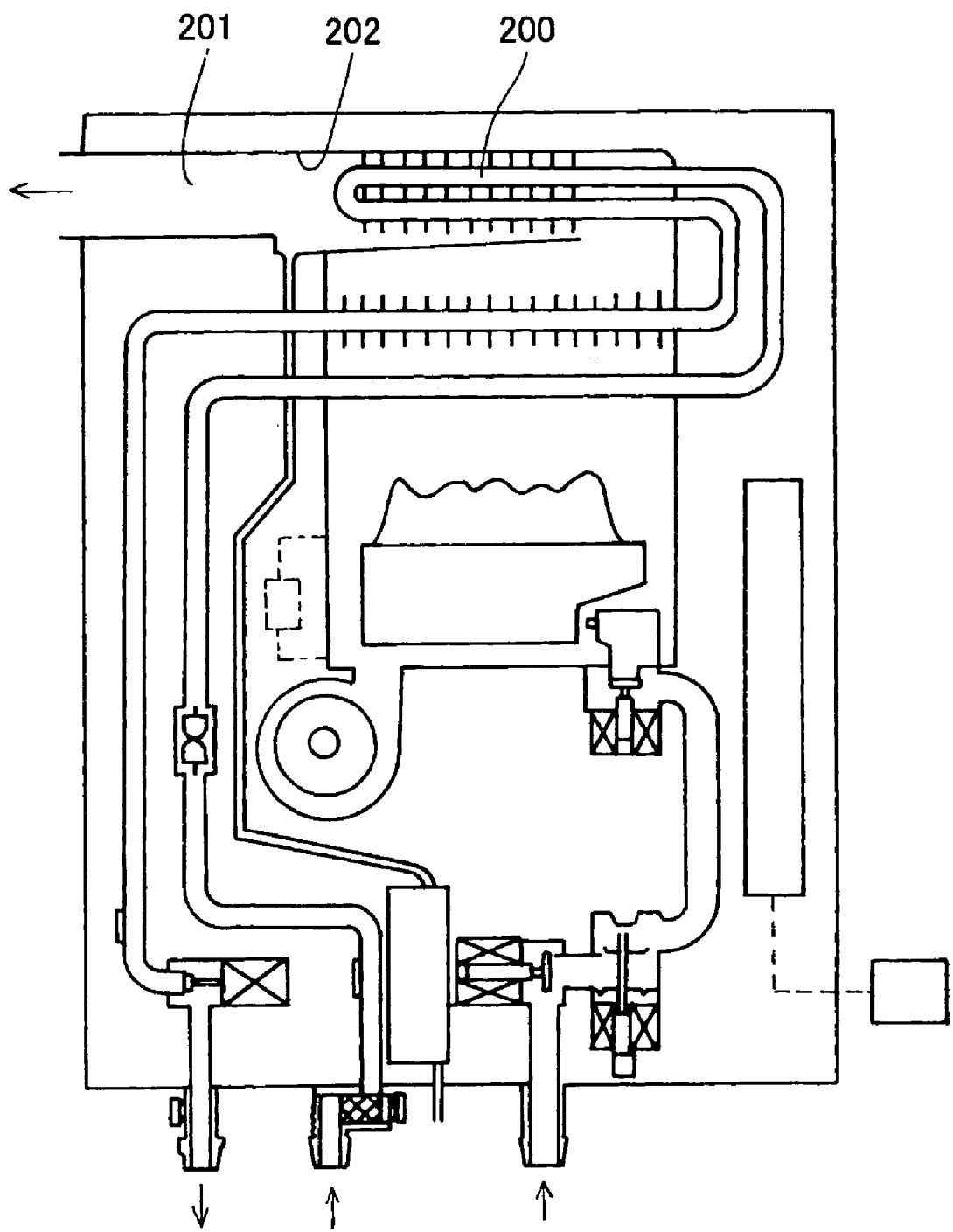
FIG. 17 is a model diagram of a heating apparatus described in JP 11-148642A.

A heating apparatus embodying the present invention to solve the problems and drawbacks described above will be described in detail below, making reference to the drawings. FIG. 12 is a schematic view of operating principle of a heating apparatus of the present embodiment. FIG. 13A is an exploded perspective view of a secondary heat exchanger for latent heat employed in the heating apparatus shown in FIG. 12. FIG. 13B is a perspective view of the secondary heat exchanger shown in FIG. 13A. FIG. 14 is an exploded perspective view showing the vicinity of the secondary heat exchanger of the heating apparatus shown in FIG. 12;

FIG. 15A is an exploded perspective view schematically showing combustion gas flow in a latent heat exchanging means employed in the heating apparatus shown in FIG. 12. FIG. 15B is an exploded perspective view of the above-mentioned latent heat exchanging means and a gas-discharging member. FIG. 15C is a cross-sectional view as taken along A-A of FIG. 15B. FIG. 16A is a cross-sectional view of a modified example of the secondary heat exchanger shown in FIG. 13. FIG. 16B is a perspective view of another modified example thereof. Herein, a casing of a latent heat exchanger in FIG. 13A and heat receiving tubes in FIG. 13B are not shown to be omitted for convenience of explanation.

Referring to FIG. 12, the numeral 101 denotes a heating apparatus of the present embodiment. The heating apparatus 101 is a so-called heating apparatus with two burners and two water passages, and mainly consists of two independent shells 102 and 103 having a sensible heat exchanging means 104 composed of primary heat exchangers (sensible heat exchange circuits) 105 and 106 mainly for transferring sensible heat of combustion gas, burners 107 and 108, and fans 110 and 111, respectively. Further, a latent heat exchanging means 115 composed of secondary heat exchangers (latent heat exchange circuits) 112 and 113 mainly for collection of latent heat from combustion gas is arranged downstream (on the upper side in FIG. 12) of a combustion gas passage in relation to the primary heat exchangers 105 and 106. In short, the latent heat exchanging means 115 has two heat exchange circuits 112 and 113 arranged in rows along a flow direction of combustion gas. Water flows through the secondary heat exchanger 112 and 113 into the primary heat exchangers 105 and 106 in a direction opposite to the combustion gas.

The primary heat exchangers 105 and 106 each are a so-called fin-and-tube heat exchanger mainly made of copper. The primary heat exchangers 105 and 106 are arranged within combustion gas passages 116 and 117 where high-temperature combustion gases generated in the burners 107 and 108 flow, respectively. The primary heat exchangers 105 and 106 function as the sensible heat exchanging means 104 mainly for transferring sensible heat of the combustion gas, so as to heat water flowing therewithin. The primary heat exchangers 105 and 106 respectively occupy entire areas of cross-sections X and Y of the combustion gas passages 116 and 117.

The primary heat exchangers 105 and 106 have water inlets 118 and 120 and water outlets 121 and 122, respectively, the formers being connected respectively to water outlets 131 and 131 of the secondary heat exchangers 112 and 113. Water after heat exchange in the secondary heat exchangers 112 and 113 flows into the primary heat exchangers 105 and 106, respectively and is further heated.

The primary heat exchanger 105 exchanges heat with combustion gas flowing in the passage 116 within the shell 102 accommodating the burner 107 having comparatively high combustion capacity. The water outlet 121 is connected to a hot water plumbing (second thermal medium supplying channel) 123b for supplying water to a terminal such as a hot-water tap 123a requiring comparatively large heat quantity per unit time but expected to intermittently supply water. Further, the primary heat exchanger 106 accommodated in the shell 103 exchanges heat with combustion gas generated in the burner 108 having comparatively low combustion capacity. The water outlet 122 of the primary heat exchanger 106 is connected to a feeding channel (first thermal medium supplying channel) 124b for supplying water to a load terminal, for example, a heating terminal 124a for heating room air, that requires comparatively small heat quantity per unit time but expected to be continuously used.

Referring to FIGS. 13A and 13B, the secondary heat exchangers 112 and 113 each are constituted by a number of heat receiving tubes 125 fixed by brazing to headers 127 and 128 arranged in parallel at the both ends of a casing 126. The casing 126 and the headers 127 and 128 make up a receptacle. The heat receiving tubes 125 are metal tubes arranged in parallel with making gaps among them so that the combustion gas is passable therethrough. Each header 127 has a water inlet 130 for introducing water from outside and a water outlet 131 for discharging water flowing from each of the heat receiving tubes 125 to outside. A water-supply pipe 123c for supplying water from outside is connected to the water inlet 130 formed at the header 127 of the secondary heat exchanger 112. A return channel 124c for returning water from the heating terminal 124a to the water inlet 130 formed at the header 127 of the secondary heat exchanger 113. The waters flowing from the respective water inlets 130 and 130 of the secondary heat exchangers 112 and 113 flow in the heat receiving tubes 125 to be heated, being discharged through the water outlets 131 and 131.

Referring to FIGS. 13B and 15, each casing 126 is a member made of a belt-like metal plate bent to be formed into a box shape. The casing 126 has a gas outlet 133 at its front face 132 and a gas inlet 136 at its back face 135 opposite to the front face 132. The gas inlet 136 is adapted to introduce combustion gas passing through the primary heat exchangers 105 and 106 into the secondary heat exchangers 112 and 113. The combustion gas introduced from the inlet 136 passes through gaps among a number of the heat receiving tubes 125 across the inside of the casing 126 to exchange heat with water within the heat receiving tubes 125. The combustion gas having exchanged heat with the water within the heat receiving tubes 125 is discharged out of the secondary heat exchangers 112 and 113 through the outlet 133.

Inside the casing 126, as shown in FIGS. 13A and 13B, a deflector 137 having a "parallel" surface 138 (that is, a surface positioned substantially parallel to the gas inlet 136) extending in a direction along the heat receiving tubes (in a substantially parallel direction in the present embodiment) is positioned across an imaginary straight line L connecting the gas outlet 133 and the gas inlet 136. In each of the secondary heat exchangers 112 and 113, the outlet 133 and the inlet 136 of the casing 126 are interrupted by the deflector 137 with the parallel surface 138 arranged in parallel to the inlet 136 and the outlet 133.

The deflector 137 functions as a resistance member for increasing resistance against combustion gas flow from the gas inlet 136 to the gas outlet 133. The deflector 137 also functions as a distributing member for making the combustion gas introduced from the inlet 136 to be distributed within the receptacle. Thus, the combustion gas introduced from the gas inlet 136 into the casing 126 turns its flow direction within the casing 126, permeating the casing 126, flowing toward the gas outlet 133, so as to contact with the entire surface of each of the tubes 125 to be heat-exchanged. Consequently, the combustion gases flowing into the secondary heat exchangers 112 and 113 are discharged after latent heat thereof is transferred substantially completely to water flowing in the tubes 125.

Referring to FIGS. 12, 14, 15A, and 15B, the secondary heat exchangers 112 and 113 have a direct contact with each other with arranged in rows along a flow direction of the combustion gas flowing in the respective combustion gas passages 116 and 117 within the shells 102 and 103, with the heat receiving tubes 125 extending over a heating system A in the shell 102 and a heating system B in the shell 103. Further, the secondary heat exchangers 112 and 113 are each extending over two areas corresponding to the areas X and Y respectively occupied by the primary heat exchangers 105 and 106 via connecting members 140 and 141, respectively. That is why the secondary heat exchangers 112 and 113 each have the heat receiving tubes longer than those of the heating apparatus 90 shown in FIG. 11 separately having the secondary heat exchangers 92a and 93a respectively in the shells 93 and 95. Thus, the secondary heat exchangers 112 and 113 each allow less heat receiving tubes 125 required for ensuring heat transfer area enough to obtain sufficient heat exchange efficiency, have a compact device configuration, and reduce the number of brazing of the tubes 125 to the headers 127 and 128.

Further, the secondary heat exchanger 112 for heating water supplied to the heating terminal 124a expected to continuously supply water is positioned in the combustion gas passage upstream (at lower position in FIG. 12) of the secondary heat exchanger 113 for heating water supplied to the hot-water tap 123a expected to intermittently supply water. In other words, the secondary heat exchanger 112 expected to continuously release heat is positioned upstream of the secondary heat exchanger 113 expected to release heat less than that. Therefore, heat released from the secondary heat exchanger 112 is transferred to the secondary heat exchangers 113, so as to be efficiently used to heat water.

The secondary heat exchangers 112 and 113, as shown in FIGS. 12 and 14, are connected to the shells 102 and 103 via the connecting members 140 and 141. The connecting means 140 and 141, as shown in FIG. 14, have meeting portions 143 and 145 connected to openings of the shells 102 and 103 and connecting portions 146 and 146, respectively, which are connected to each other to form a passage of a substantially L shape. The connecting portions 146 and 147 each have surface contacts with the back faces 135 and 135 of the casings 126 and 126 of the secondary heat exchangers 112 and 113. The height of the connecting portion 147 equal to a height h of the secondary heat exchanger 112, whereas the height of the connecting portion 146 equals to a height H of the stacked secondary heat exchanged 112 and 113. The secondary heat exchangers 112 and 113 are stacked one above the other, as shown in FIG. 14, with the top face of the exchanger 112 having a direct contact with the bottom face of the exchanger 113, the respective back faces 135 and 135 of the both exchangers 112 and 113 having a surface contact with the connecting portion 146, the back face 135 of the lower exchanger 112 also having a surface contact with the connecting portion 147, and the bottom face of the lower exchanger 112 having a surface contact with the meeting portions 143 and 145. In short, the heat exchangers 112 and 113 constituting a plurality of heat exchange circuits are stacked one above the other so as to thermally contact with each other.

The meeting portions 143 and 145 respectively have openings 143a and 145a for introducing thereinto the combustion gas flowing in the combustion gas passages 116 and 117 within the shells 102 and 103. The connecting portions 146 and 147 respectively have openings 148 and 150 for discharging the combustion gas. The openings 148 and 150 are respectively arranged at positions corresponding to the gas inlets 136 and 136 of the secondary heat exchangers 112 and 113 stacked on the meeting portions 143 and 145 described above and connected to the inlets 136 and 136 in an airtight condition.

The secondary heat exchangers 112 and 113 have on their front faces a gas-discharging member 155 in the form of a window frame through which the combustion gas discharged outside from the receptacle passes, as shown in FIG. 15. The gas-discharging member 155 mainly consists of a protruding portion 156 and a flange 157. The protruding portion 156 has four openings 158 for discharging gas. The gas-discharging member 155 is attached to the secondary heat exchangers 112 and 113 so that the flange 157 has a surface contact with the front faces 132 and 132 of the exchangers 112 and 113. Further, both of the gas outlets 133 and 133 of the exchangers 112 and 113 are formed in an outlet-forming area 160, a hatched area in FIG. 15B. The gas-discharging member 155 is attached so that the outlet-forming area 160 is covered with the protruding portion 156. Thereby, as shown in FIG. 15C, a gas-inflow space 161 is formed between the outlet-forming area 160 and the protruding portion 156.

Next, flow of combustion gas in the heating apparatus 101 of the present embodiment will be described in detail below with reference to the accompanying drawings. The heating apparatus 101 separately has the shell 102 and the shell 103, the shell 102 accommodating the burner 107 for heating water to be discharged from the hot-water tap 123a, the shell 103 accommodating the burner 108 for heating water supplied to the heating terminal 124a. Combustion gas generated in the burner 107 passes through the primary heat exchanger 105 arranged in the combustion gas passage 116 within the shell 102 to heat water in the primary heat exchanger 105. The combustion gas that has transferred mainly its sensible heat to the water in the primary heat exchanger 105 reaches the connecting member 140 positioned at the most downstream of the passage 116.

The combustion gas having passed through the primary heat exchanger 105 meets in the meeting portion 143 of the connecting member 140, passing through the opening 148 of the connecting portion 146 and the gas inlet 136, flowing into the secondary heat exchanger 113. The combustion gas having flowed into the secondary heat exchanger 113 is made to deflect its flow direction in a direction along the heat receiving tubes 125 by the deflector 137 facing to the gas inlet 136, as indicated by arrows in FIG. 15A. Then, the combustion gas comes up against an inner wall of the casing 126 adjacent to the header 127, so that the flow is deflected again, flowing toward the gas outlet 133. Therefore, the combustion gas having flowed into the casing 126 of the secondary heat exchanger 112 is retained in the casing 126 for a long period of time, with fully diffused in internal spaces of the casing 126, and discharged after a surface contact with the entire surface of each of the heat receiving tubes 125.

On the other hand, combustion gas generated by operation of the burner 108 so as to heat water for air heating flows downstream in the combustion gas passage 107, that is, upwardly in FIG. 12, reaching the primary heat exchanger 106. Inside the primary heat exchanger 106, most of sensible heat of the combustion gas flowing in the passage 117 is transferred to water by heat exchange with the water flowing in the exchanger 106. Thereafter, the combustion gas flows into the meeting portion 145 of the connecting member 141 positioned downstream of (or above) the exchanger 106.

The combustion gas having flowed in the meeting portion 145 flows in the connecting portion 147 up to the opening 150 of the secondary heat exchanger 112. Then, the combustion gas is introduced into the secondary exchanger 112 through the gas inlet 136 communicating with the opening 150. The combustion gas having flowed into the secondary heat exchanger 112 is made to deflect its flow direction by the deflector 137, flowing in the casing 126 in turning its direction, so as to be fully diffused in internal spaces of the casing 126. In the meantime, the combustion gas has a surface contact with the entire surface of each of the heat receiving tubes 125 to exchange heat with low-temperature water introduced into the tubes 125 from outside, whereupon its latent heat is transferred to the water in the tubes 125. Thereafter, the combustion gas reaches the gas outlet 133 positioned at the front face 132 of the secondary heat exchanger 112 to be discharged out of the casing 126.

The combustion gases having flowed in the secondary heat exchangers 112 and 113 to be discharged out of the casings 126 and 126 through the gas outlets 133 and 133 in this way flow into the gas-inflow space 161 between the protruding portion 156 of the gas-discharging member 155 and the outlet-forming area 160 of the latent heat exchanging means 115 and are diffused therein. Thereafter, the gas is discharged outside through the openings 158.

As described above, the heating apparatus 101 of the present embodiment is constituted in such a manner that the heat receiving tubes 125 constituting the latent heat exchanging means 115 extend over substantially entirely the respective combustion gas passages 116 and 117 within the shells 102 and 103 and also cross a part corresponding to a gap between the shells 102 and 103. Therefore, the heat receiving tubes 125 are longer than those in the heating apparatus 90 shown in FIG. 11 in which the latent heat exchanging means 92a and 92b respectively extend over the combustion gas passages 95 and 97 within the shells 93 and 96.

Further, the secondary heat exchanger 112 and 113 constituting the latent heat exchanging means 115 employed in the heating apparatus 101 has the deflector 137 within the casing 126 so as to increase contact of the gas with the tubes 125, whereby the combustion gas is made to turn its direction to be fully diffused within the casing 126. Thereby, in the heating apparatus 101, the combustion gas is retained in the casing 126 for a long period of time, and then discharged after heat exchange by substantially entire surfaces of the tubes 125. Consequently, the heating apparatus 101 sufficiently utilize latent heat of combustion gas even with the heat receiving tubes 125 being less numerous than that in such a configuration as the heating apparatus 90.

Still further, the heating apparatus 101 of the present embodiment allows a compact configuration of the secondary heat exchangers 112 and 113 because latent heat is sufficiently utilized even with the tubes 125 being small in number. Therefore, the above-mentioned configuration reduces space for installation of the latent heat exchanging means 115, thereby providing the heating apparatus 101 in a small size.

As the heating apparatus 101 of the present invention has such a configuration that the secondary heat exchangers 112 and 113 are stacked to contact with each other, heat released from one of them are transferred to and recovered by the other. Further, the heating apparatus 101 has such a configuration that the secondary heat exchanger 112 for heating water supplied to the heating terminal 124a is positioned below the secondary heat exchanger 113 for supplying water to the hot-water tap 123a, that is, upstream in a flowing direction of the combustion gas. Specifically, in the heating apparatus 101, the secondary heat exchanger 112 for air heating expected to continuously carry out heat exchange and have a large amount of heat release is arranged upstream of (below) the secondary heat exchanger 113 for hot water supply expected to intermittently carry out heat exchange and have a relatively small amount of heat release. Consequently, the heating apparatus 101 sufficiently recover the heat released from the secondary heat exchangers 112 and 113, achieving high heat use (recovery) efficiency.

In the heating apparatus 101, the combustion gas having been discharged from the outlets 133 and 133 of the secondary heat exchangers 112 and 113 is discharged outside through the openings 158 after having flowed into the gas-inflow space 161 and been diffused. Thus, the combustion gas discharged through the openings 158 flows slowly and generates little discharging noise.

Further, in the heating apparatus 101, as the outlets 133 and 133 of the secondary heat exchangers 112 and 113 meet in the outlet-forming area 160 and are covered by the gas-discharging member 155, an overall configuration is clearer and more beautiful than such a configuration of the outlets 133 and 133 arranged in an uncoordinated fashion.

The deflector 137 is preferably arranged in such a manner as interrupting the imaginary straight line connecting the gas inlet 136 and the gas outlet 133 formed on the casing 126 as the above-mentioned embodiment, but may be arranged in another way. Further, the heating apparatus 101 may have a resistance member 165 instead of the deflector 137, the resistance member 165 being formed by an area having high resistance against flow of the combustion gas by densely arranging a part of the heat receiving tubes 125 as shown in FIG. 16A. Such a configuration deflects the combustion gas introduced into the secondary heat exchangers 112 and 113 in a predetermined direction, thereby extending retention time or passage length of the gas to ensure the diffusion of the gas in the casing 126. Consequently, the heating apparatus 101 permits the entire surface of each of the heat receiving tubes 125 to be a heat transfer surface, achieving high heat exchange efficiency.

Still further, the heating apparatus 1 may have such a configuration, as shown in FIG. 16B, as arranging a gas-diffusion member such as a mesh 170 or a punching metal around the gas inlet 136 or within the casing 126. Such a configuration diffuses the combustion gas in the casing 126, thereby extending retention time of the gas and making effective use of the entire surfaces of the tubes 125 crossing within the casing 126 as a heat transfer surface for heat exchange with the gas.

The heating apparatus 101 of the present embodiment is provided with one heating system adapted to supply water to the hot-water tap 123a and the other heating system adapted to supply water to the heating terminal 124a, but the present invention is not limited thereto and, for example, may be provided with a system such as a heating system adapted to heat water in a bathtub not shown instead of the heating system for the heating terminal 124a or may be separately provided with such a heating system. Herein, in the case of a heating system for heating water to be supplied to a bathtub, the secondary heat exchanger for heating water to be supplied to a terminal expected to be continuously used very often is preferably arranged upstream in a direction of combustion gas flow.

The heating apparatus 101 of the present embodiment has the secondary heat exchangers 112 and 113 of multi-tube type as latent heat exchangers, but the present invention is not limited thereto and, for example, may have as the primary heat exchangers 105 and 106 a multi-tube heat exchanger having the same configuration as the secondary heat exchangers 112 and 113. Further, the above-mentioned heating apparatus 101 is a so-called heat source equipment of the latent heat recovery type provided with the primary heat exchangers 105 and 106 mainly for utilizing sensible heat of combustion gas and the secondary heat exchangers 112 and 113 mainly for utilizing latent heat of combustion gas, but the present invention is not limited thereto and may be a heating apparatus that employs a multi-tube heat exchanger having as the primary heat exchangers 105 and 106 the same configuration as the secondary heat exchangers 112 and 113 and dispenses with the secondary heat exchangers 112 and 113.

The invention claimed is:

1. A heating apparatus comprising:
   a burner,
   a combustion gas passage for guiding combustion gas generated in the burner,
   a primary heat exchanger for heating water by heat of the combustion gas and positioned in the combustion gas passage, and
   a secondary heat exchanger for heating water by heat of the combustion gas and positioned in the passage downstream of the primary heat exchanger,
   wherein the primary and secondary heat exchangers are connected so that water having passed through the secondary heat exchanger flows into the primary heat exchanger,
   wherein the secondary heat exchanger comprises a number of heat receiving tubes arranged in parallel,
   wherein the secondary heat exchanger comprises a pair of headers between which the heat receiving tubes are arranged in parallel,
   the headers each comprising a tube plate with a surface to which the heat receiving tubes are fixed and a passage-forming member positioned at another surface of the tube plate so as to form a part of a water passage,
   the headers functioning as parts of walls of the combustion gas passage extending from the burner to a gas-discharging portion.

2. A heating apparatus comprising:
   a burner,
   a combustion gas passage for guiding combustion gas generated in the burner,
   a primary heat exchanger for heating water by heat of the combustion gas and positioned in the combustion gas passage, and a secondary heat exchanger for heating water by heat of the combustion gas and positioned in the passage downstream of the primary heat exchanger, wherein the primary and secondary heat exchangers are connected so that water having passed through the secondary heat exchanger flows into the primary heat exchanger, wherein the secondary heat exchanger comprises a number of heat receiving tubes arranged in parallel, the heating apparatus having a plurality of the burners and a plurality of the combustion gas passages, so that the apparatus consists mainly of a plurality of heating systems each constituted by at least one of the burners and at least one of the passages, the heating apparatus further having a plurality of the primary heat exchangers accompanying the heating systems respectively, wherein the secondary heat exchanger has a plurality of the heat receiving tubes extending over at least two of the heating systems.

3. A heating apparatus comprising:

a burner, a combustion gas passage for guiding combustion gas generated in the burner, a primary heat exchanger for heating water by heat of the combustion gas and positioned in the combustion gas passage, and a secondary heat exchanger for heating water by heat of the combustion gas and positioned in the passage downstream of the primary heat exchanger, wherein the primary and secondary heat exchangers are connected so that water having passed through the secondary heat exchanger flows into the primary heat exchanger, wherein the secondary heat exchanger comprises a number of heat receiving tubes arranged in parallel, wherein the secondary heat exchanger is constituted by a pair of headers between which the heat receiving tubes are arranged in parallel, the headers each comprising a tube plate with a surface to which the heat receiving tubes are fixed and a passage-forming member positioned at another surface of the tube plate so as to form a part of a water passage, the heat receiving tubes being arranged in such a manner that a plurality of the water passages each constituted by a plurality of the heat receiving tubes are communicated mutually by a plurality of the passage-forming members, so as to make up a unitary passage in which water flows in turning flow direction.

* * * * *

UNITED STATES PATENT AND TRADEMARK OFFICE
CERTIFICATE OF CORRECTION

| | | |
|---|---|---|
| PATENT NO. | : 7,647,897 B2 | Page 1 of 1 |
| APPLICATION NO. | : 10/593350 | |
| DATED | : January 19, 2010 | |
| INVENTOR(S) | : Ootomo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this

Twenty-eighth Day of December, 2010

David J. Kappos
*Director of the United States Patent and Trademark Office*